United States Patent
Oh et al.

(10) Patent No.: US 11,269,956 B2
(45) Date of Patent: Mar. 8, 2022

(54) SYSTEMS AND METHODS OF MANAGING AN INDEX

(71) Applicant: TmaxData Co., Ltd., Gyeonggi-do (KR)

(72) Inventors: Jaemin Oh, Seoul (KR); Taikyoung Kim, Gyeonggi-do (KR); Jaehyeong Cho, Gyeonggi-do (KR)

(73) Assignee: TMAXDATACO., LTD.

( * ) Notice: Subject to any disclaimer, the term of this patent is extended or adjusted under 35 U.S.C. 154(b) by 300 days.

(21) Appl. No.: 16/373,124

(22) Filed: Apr. 2, 2019

(65) Prior Publication Data

US 2020/0257732 A1  Aug. 13, 2020

(30) Foreign Application Priority Data

Feb. 7, 2019   (KR) .................. 10-2019-0014308

(51) Int. Cl.
*G06F 16/23* (2019.01)
*G06F 16/901* (2019.01)
*G06F 16/903* (2019.01)

(52) U.S. Cl.
CPC ...... *G06F 16/9027* (2019.01); *G06F 16/2322* (2019.01); *G06F 16/90348* (2019.01)

(58) Field of Classification Search
CPC .................. G06F 16/2322; G06F 16/9027
See application file for complete search history.

(56) References Cited

U.S. PATENT DOCUMENTS

| | | | |
|---|---|---|---|
| 5,446,887 A * | 8/1995 | Berkowitz | .......... G06F 16/9027 |
| 5,903,888 A | 5/1999 | Cohen et al. | |
| 6,278,992 B1 | 8/2001 | Curtis et al. | |
| 7,120,637 B2 | 10/2006 | Bailey | |
| 9,626,398 B2 | 4/2017 | Graefe et al. | |
| 9,697,243 B2 | 7/2017 | Kang et al. | |
| 10,176,217 B1 * | 1/2019 | Dang | .................. G06F 16/182 |
| 10,769,132 B1 * | 9/2020 | Sharif | ................. G06F 16/2365 |
| 2007/0174309 A1 | 7/2007 | Pettovello | |
| 2013/0103680 A1 * | 4/2013 | Arrasvuori | .......... G06F 16/3334 707/728 |

(Continued)

FOREIGN PATENT DOCUMENTS

JP        2004-326404 A     11/2004
KR     1020130064379       6/2013
(Continued)

*Primary Examiner* — Robert W Beausoliel, Jr.
*Assistant Examiner* — Nirav K Khakhar
(74) *Attorney, Agent, or Firm* — Fish IP Law, LLP

(57) ABSTRACT

Disclosed is a computer program stored in a computer readable storage medium according to an exemplary embodiment of the present disclosure. The computer program executes operations for enhancing search performance of data when the computer program is executed by one or more processors and the operations may include: setting a traverse time stamp of an index search for searching a target index key; searching the index tree along a link connected from a root node of the index tree to a leaf node; writing in a time stamp table at least one index time stamp of the root node and the leaf node passed in the index search; determining whether a path of the index search needs to be changed; and determining a start node of re-search at least partially based on the time stamp table.

16 Claims, 12 Drawing Sheets

(56) References Cited

U.S. PATENT DOCUMENTS

2013/0304744 A1* 11/2013 McSherry ............. G06F 16/248
707/741
2016/0321376 A1* 11/2016 Taylor ................. G06F 16/9024
2018/0182170 A1* 6/2018 Lim ..................... G06T 19/006

FOREIGN PATENT DOCUMENTS

| KR | 1020150094044 | 8/2015 |
| KR | 10-1587158 B1 | 1/2016 |

* cited by examiner

SYSTEMS AND METHODS OF MANAGING AN INDEX

CROSS-REFERENCE TO RELATED APPLICATIONS

This application claims priority to and the benefit of Korean Patent Application No. 10-2019-0014308 filed in the Korean Intellectual Property Office on Feb. 7, 2019, the entire contents of which are incorporated herein by reference.

FIELD OF THE INVENTION

The field of the invention is database management methods and database index searching.

BACKGROUND

Businesses of enterprises are rapidly expanding with explosive data growth and the emergence of diverse environments and platforms. As new business environments emerge, more efficient and flexible data services and information processing, and data management functions are needed. In response to these changes, a research is continued on databases to solve problems of high performance, high availability, and scalability which are foundations of corporate business implementation.

In a database management system (DBMS), data may be stowed in data storage. In a relational database management system (RDBMS), the data storage may be referred to as a table. The table may include one or more rows and each of the one or more rows may include one or more columns.

When a database includes a large amount of data, it may take a relatively long time to perform a query to retrieve data requested by a user. When it takes a long time for the database to respond to the query, it may adversely affect performance of the database. Accordingly, in the art, various techniques are researched for reducing a time required for processing for responding to a query, that is, for enhancing the performance of the database management system.

In order to enhance a data retrieval speed from the database, an indexing technique can be utilized. The index can refer to a data structure that increases an operation speed for the table in a database field. When the index is used, not only a time required for data retrieval can be reduced, but also the amount of resources consumed in the data retrieval can be reduced.

In general, the index structure consists of a tree structure. The tree structure as a kind of graph is constituted by a node and a pointer indicating the node. When a large quantity of stored data need to be searched, a scheme that compares the data one by one is inefficient. When the data are stored in an arrangement state through indexing using the tree structure, the data may be efficiently retrieved. A traverse means a series of processes of searching the index. The traverse is performed by a process of finding a next node by comparing a value of a search target and a division value by starting from a root node. When the index corresponding to the value of the search target is discovered through the traverse, the traverse ends.

Among the index structures, a B-tree index structure has a key for accessing a lower level for each node. Further, in the related art, when multiple threads simultaneously modify or refer to a B-tree index, a scheme of maintaining consistency of the index through lock is used. However, such a scheme has a problem that when a change of the index structure is detected, research from a topmost root node needs to be performed, thereby reducing concurrency of an operation and degrading performance of a system.

Thus, there is still a need for methods of managing indexes more efficiently using traverse time stamps for searching index trees.

SUMMARY OF THE INVENTION

The present disclosure has been made in an effort to provide an efficient index searching method in a database.

An exemplary embodiment of the present disclosure provides a computer program stored in a computer readable storage medium. The computer program executes the following operations for enhancing search performance of data when the computer program is executed by one or more processors and the operations may include: setting a traverse time stamp of an index search for searching a target index key; searching the index tree along a link connected from a root node of the index tree to a leaf node; writing in a time stamp table at least one index time stamp of the root node, a branch node, and the leaf node read in the index search; and determining whether to change a search path for the target index key based on the traverse time stamp and the index time stamp.

In an alternative embodiment, the index time stamp may be assigned for each node included in the index tree and generated based on information on a time when each node is modified.

In an alternative embodiment, the writing of in the time stamp table at least one index time stamp of the root node, the branch node, and the leaf node read in the index search may include matching the index time stamp read in at least one of the root node, the branch node, and the leaf node with each node identifier and writing the matched index time stamp and node identifier in the time stamp table.

In an alternative embodiment, the writing of in the time stamp table at least one index time stamp of the root node, the branch node, and the leaf node read in the index search may include writing in the time stamp table the index time stamp from a current search node up to a predetermined number of previous search nodes among search nodes read in the index search.

In an alternative embodiment, the writing of in the time stamp table at least one index time stamp of the root node, the branch node, and the leaf node read in the index search may further include deleting the one or more index time stamps written in the time stamp table based on a predetermined criterion.

In an alternative embodiment, the determining of whether to change the search path for the target index key based on the traverse time stamp and the index time stamp may include determining to maintain the search path for the target index key when the traverse time stamp is equal to or larger than the index time stamp of the search node, and determining to change the search path for the target index key when the traverse time stamp is smaller than the index time stamp of the search node.

In an alternative embodiment, the determining of whether to change the search path for the target index key based on the traverse time stamp and the index time stamp may include determining whether to change the search path for the target index key based on contents of the search node when the traverse time stamp is smaller than the index time stamp of the search node.

In an alternative embodiment, the determining of whether to change the search path for the target index key based on contents of the search node when the traverse time stamp is smaller than the index time stamp of the search node may include determining whether the search path for the target index key needs to be changed based on bound information including at least one information of a minimum value and a maximum value of an index key which may be included in the search node for the search node and the target index key.

In an alternative embodiment, the determining of whether the search path for the target index key needs to be changed based on the bound information including at least one information of the minimum value and the maximum value of the index key which may be included in the search node for the search node and the target index key may include determining to maintain the search path for the target index key when a value of the target index key falls within the bound information, and determining to change the search path for the target index key when the value of the target index key does not fall within the bound information.

In an alternative embodiment, the determining of whether to change the search path for the target index key based on contents of the search node when the traverse time stamp is smaller than the index time stamp of the search node may further include updating the traverse time stamp based on the index time stamp of the current search node when determining to maintain the search path for the target index key. The operations may further include updating the traverse time stamp when determining to change the search path for the target index key.

In an some embodiments, the updating of the traverse time stamp may include updating the traverse time stamp based on a time information when comparing the traverse time stamp and the index time stamp of the search node or updating the traverse time stamp based on a time information when an index search threads starts reading of a start node of re-search. The operations may further include determining the start node of the re-search at least partially based on the time stamp table.

In an alternative embodiment, the determining of the start node of the re-search at least partially based on the time stamp table may include determining whether each previous search node written in the time stamp table is changed after the search, and determining as the start node of the re-search one of previous search nodes which are not changed after the search among the previous search nodes.

In yet another alternative embodiment, the determining of whether each previous search node written in the time stamp table is changed after the search may include determining whether the previous search node is changed after the search by comparing each index time stamp of the previous search node written in the time stamp table and the index time stamp of each previous search node read at the time of the re-search.

In some embodiments, the determining of as the start node of the re-search one of previous search nodes which are not changed after the search among the previous search nodes may include determining as the start node of the re-search a nearest node of the current search node among the previous search nodes which are not changed after the search.

Another exemplary embodiment of the present disclosure provides a method for enhancing search performance of data performed by one or more processors of a computer device. The method may comprise the steps of setting a traverse time stamp of an index search for searching a target index key, searching the index tree along a link connected from a root node of the index tree to a leaf node, writing in a time stamp table at least one index time stamp of the root node, a branch node, and the leaf node read in the index search, and determining whether to change a search path for the target index key based on the traverse time stamp and the index time stamp.

Yet another exemplary embodiment of the present disclosure provides a computing device for enhancing search performance of data. The computing device may comprise a processor including one or more cores and a memory, wherein the memory can be persistent and/or volatile. The one or more processors may execute program instructions to set a traverse time stamp of an index search for searching a target index key, search the index tree along a link connected from a root node of the index tree to a leaf node, write in a time stamp table at least one index time stamp of the root node, a branch node, and the leaf node read in the index search, and determine whether to change a search path for the target index key based on the traverse time stamp and the index time stamp.

Effects which can be obtained in the present disclosure are not limited to the aforementioned effects and other unmentioned effects will be clearly understood by those skilled in the art from the following description.

This application claims priority to and the benefit of Korean Patent Application No. 10-2019-0014308 filed in the Korean Intellectual Property Office on Feb. 7, 2019, the entire contents of which are incorporated herein by reference.

The present invention advantageously teaches an efficient index searching method in a database can be provided.

DETAILED DESCRIPTION

Figure 1:
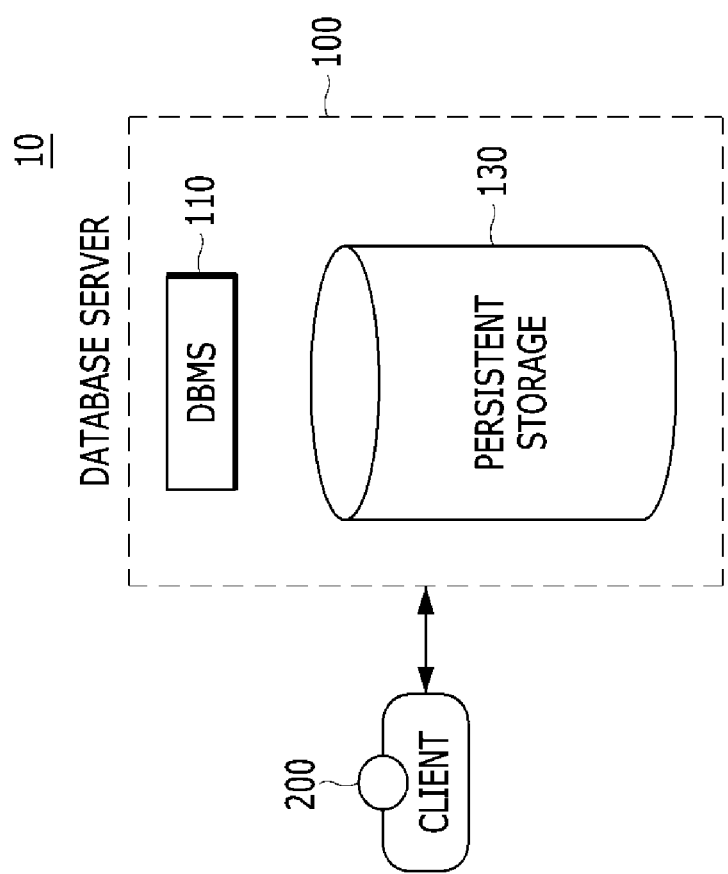
FIG. 1 is a schematic view of a database system according to an exemplary embodiment of the present disclosure.

It should be noted that while the following description is drawn to a computer-based scheduling system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

Various exemplary embodiments will now be described with reference to drawings and like reference numerals are used to refer to like elements throughout all drawings. In the present specification, various descriptions are presented to provide appreciation of the present disclosure. However, it is apparent that the exemplary embodiments can be executed without the specific description. In other examples, known structures and apparatuses are presented in a block diagram form in order to facilitate description of the exemplary embodiments.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or the execution thread and one component may be localized in one computer or distributed among two or more computers. Further, the components may be executed by various computer-readable media having various data structures, which are stored therein. The components may perform communication with another system through local and/or remote processing according to a signal (for example, data from one component that interacts with other components and/or data from other systems through a network such as the Internet through a signal in a local system and a distribution system) having one or more data packets, for example.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is consistent with the principles and new features presented herein.

A basic concept of an indexing technique according to an exemplary embodiment of the present disclosure is discussed in detail in U.S. Pat. No. 9,626,398 (Apr. 4, 2017) and US2007-0174309 (Jul. 26, 2007), the entirety of which is incorporated by reference herein. This application claims priority to and the benefit of Korean Patent Application No. 10-2018-0073852 filed in the Korean Intellectual Property Office on Jun. 27, 2018, which is associated with schemes for managing an index tree of a database, the entire contents of which are incorporated herein by reference.

FIG. 1 is a schematic view of a database system 10 according to an exemplary embodiment of the present disclosure.

As illustrated in FIG. 1, the database system 10 according to the present disclosure may include a client 200 and a database server 100. The database server 100 in the present specification may be used interchangeably with a database.

As illustrated in FIG. 1, the client 200 may mean a node(s) in a database system 10 having a mechanism for communication through a network. For example, the client 200 may include a predetermined electronic device having connectivity with a personal computer (PC), a laptop computer, a workstation, a terminal, and/or the network. Further, the client 200 may include a predetermined server implemented by at least one of agent, application programming interface (API), and plug-in. For example, the client 200 in FIG. 1 may be associated with a user (e.g., database administration (DBA)) using the database server 100. In such an example, the client 200 may issue to the database server 100 various types of queries including a DML and a data definition language (DDL).

The database server 100 may include, for example, a predetermined type of computer system or computing device such as a microprocessor, a mainframe computer, a digital single processor, a portable device, and a device controller. Each of the database servers 100 may include a database management system (DBMS) 110 and a persistent storage 130.

In FIG. 1, only one database server 100 is illustrated, but it will be apparent to those skilled in the art that database servers therethan may also be included in the scope of the present disclosure and the database server 100 may include additional components. That is, the database server 100 may be constituted by a plurality of computing devices. A set of a plurality of nodes may constitute the database server 100. For example, although not illustrated in FIG. 1, the database server 100 may include one or more memories including a buffer cache. Further, although not illustrated in FIG. 1, the database server 100 may include one or more processors 120. Therefore, the DBMS 110 may be operated by the processor 120 on the memory.

The memory in the present specification as a primary storage device directly accessed by the processor, such as a random access memory (RAM) including a dynamic random access memory (DRAM), a static random access memory (SRAM), etc., may mean a volatile storage device in which stored information is momentarily erased when power is turned off, but is not limited thereto. The memory may be operated by control by the processor 120. The memory may temporarily store a data table including a data value. The data table may include the data value and in an exemplary embodiment of the present disclosure, the data value of the data table may be written in the persistent storage 130 from the memory. In an additional aspect, the memory may include the buffer cache and data may be stored in a data block of the buffer cache. The data stored in the buffer cache may be written in the persistent storage 130 by a background process.

The persistent storage 130 may mean a non-volatile storage medium which may consistently store predetermined data, such as a magnetic disk, an optical disk, and a magneto-optical storage device and a storage device based on a flash memory and/or a battery-backup memory. The persistent storage 130 may communicate with the processor 120 and the memory of the database server 100 through various communication means. In an additional exemplary embodiment, the persistent storage 130 is positioned outside the database server 100 to communicate with the database server 100. According to an exemplary embodiment of the present disclosure, the persistent storage 130 and the memory may be collectively called a storage unit 140.

The DBMS 110 as a program for permitting the database server 100 to perform operations including parsing of a query, retrieval, insertion, modification, deletion, index generation, and/or index access of required data may be implemented by the processor 120 in the memory of the database server 100 as described above.

The client 200 and the database server 100 or the database servers may also communicate with each other through the network (not illustrated). The network according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network presented in the present specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems. For example, the network may include a database link (dblink), and as a result, a plurality of database servers communicates with each other through the database link to fetch data from another database server 100. The techniques described in the present specification may be used in other networks in addition to the aforementioned networks.

Figure 2:
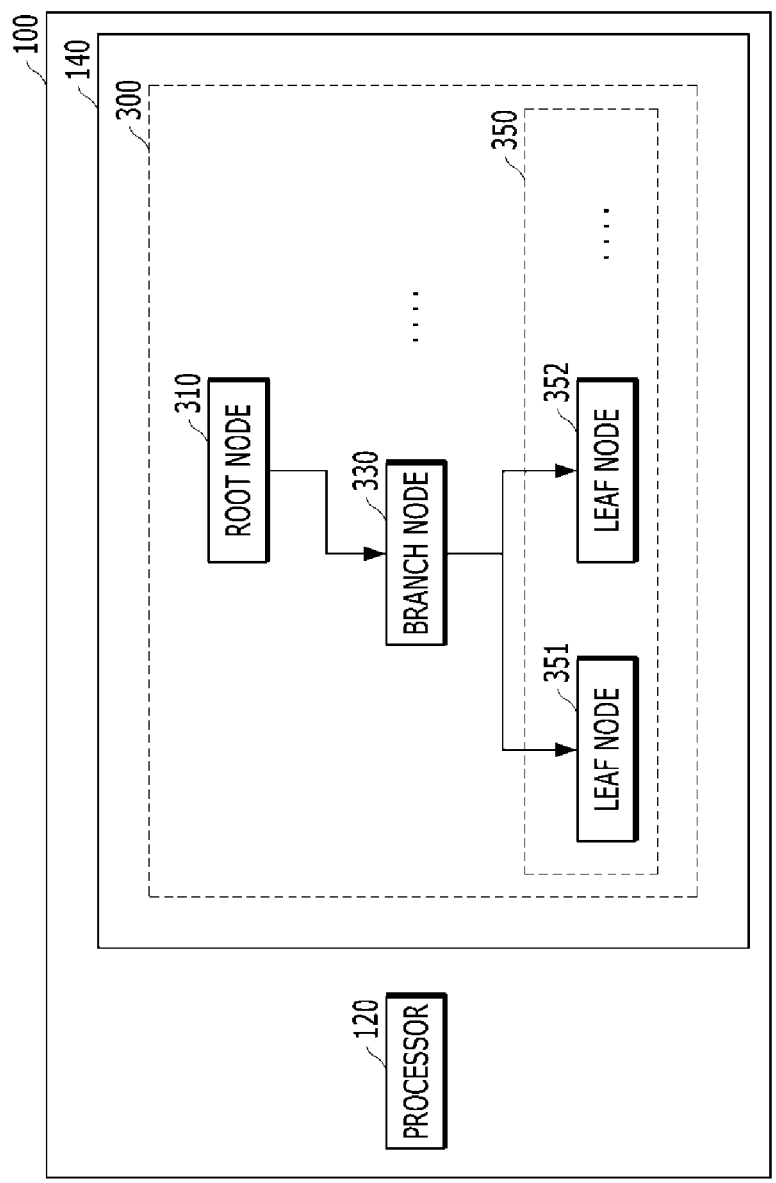
FIG. 2 is a block diagram of a database server according to an exemplary embodiment of the present disclosure.

FIG. 2 is a block diagram of a database server according to an exemplary embodiment of the present disclosure.

As illustrated in FIG. 2, the database server 100 may include a processor 120 and a storage unit 140. Here, the storage unit 140 may be a concept collectively referred to as the memory and the persistent storage 130 as described above with reference to FIG. 1. In addition, the DBMS 110 may be executed by the processor 120 and stored in the memory and/or the persistent storage 130. In this case, the storage unit 140 communicates with the processor 120 to control data storage/management.

The processor 120 executes the DBMS 110 on the memory to perform various operations to be described below. In addition, the processor 120 includes one or more threads to perform a predetermined operation for each thread. For example, the processor 120 may perform a generating operation of a database index tree 300. As another example, the processor 120 may perform the traverse for a target index key value, that is, search for the target index key value in the index tree 300 through the generated database index tree 300. The disclosure of the operation of the processor 120 is just an example and the present disclosure is not limited thereto.

In the following text, the index key value may mean a value assigned to the data stored in the storage unit 140 in a logical order. Accordingly, the index key value of the data included in each node may be located in each node (e.g., a root node 310, a branch node 330, and a leaf node 350) of the database index tree 300. Further, in the index tree 300, all index key values may be stored in a sequentially sorted state. In addition, in each node, the index key value may be stored in the sequentially sorted state.

The target index key value may mean an index key value corresponding to data to be searched in the index tree 300. In addition, the target index key value may be determined based on the query issued from the client 200. Further, since data to be accessed by each thread is different, the target index key value assigned to each thread may be different.

The processor 120 according to an exemplary embodiment of the present disclosure may initiate an index search to retrieve the target index key from the root node 310 of the index tree 300. More specifically, the processor 120 may determine the target index key value to be searched based on the query issued from the client 200. Further, the processor 120 may assign the target index key value to an index search thread that performing the index search. In addition, the index search thread may perform the search until reaching the leaf node 350 which is a bottommost level from the root node 310 which is the topmost level node of the index tree 300 via the branch node 330.

Here, like the root node 310 and the branch node 330, each node including another node in a lower level thereof may include one or more lower links connected to the node in the lower level. Here, the lower link may mean an address value for performing the search from the root node 310 to the branch node 330 or from the branch node 330 to the leaf node 350. That is, the lower link may include an address value of a child node located at a parent node in order to perform the search from the parent node to the child node.

Further, each lower link may be classified into one of a lower direction lower link, a middle direction lower link, and a higher direction lower link according to the index key included in the node in the lower level. More specifically, the lower direction lower link may be a link connected to the child node including a key having a value smaller than a key having a minimum value included in a node currently being searched among the branch nodes 330.

Further, the higher direction lower link may be a link connected to the child node including a key having a value larger than a key having a maximum value included in the node currently being searched among the branch nodes 330.

Further, the middle direction lower link may be a link connected to the child node including a key located between the minimum value and the maximum value of the key included in the node currently being searched among the branch nodes 330.

In addition, according to the exemplary embodiment, when the number of index keys included in the node is two or more, the corresponding node may include the middle direction lower link connected to the leaf node corresponding to a section where each index key is formed. That is, the middle direction lower link may be a link connected to the leaf node including a key of a value larger than the key having the minimum value and smaller than the key having the maximum value included in the node being currently searched and not included in the node being currently searched among the leaf nodes 350.

The processor 120 may search the index tree from the parent node to the child node according to the link connected to the child node. The processor 120 compares the index key value included in each index node and the target index key value to determine a link to perform the search. In addition, the processor 120 may perform the index search along the lower link connected to the determined leaf node 350.

More specifically, in the B-tree index structure, all of the index keys may be stored in the sequentially sorted state. In each node, all of the index keys may be stored in the sequentially sorted state. For example, each node of the index tree may be one or more data blocks. Accordingly, the processor 120 accesses the root node 310 in the topmost level to compare the index key value included in the root node 310 with the target index key value to be searched. In addition, the processor 120 may perform the index search to the lower direction branch node 330 connected to the lower direction lower link when the target index key is a value less than the key having the minimum value among the keys in the root node 310. Further, the processor 120 may perform the index search to the higher direction branch node connected to the higher direction lower link when the target index key has a value larger than the key having the maximum value among the keys in the root node 310. Further, according to the exemplary embodiment, the processor 120 may perform the index search to the middle direction branch node connected to the middle direction lower link when the target index key has a value larger than the key having the minimum value and smaller than the key having the maximum value among the keys in the root node 310 and is a value not included in the root node 310. In addition, the processor 120 may determine the leaf node 350 to be searched by performing the same operation by accessing the branch node 330.

Figure 3:
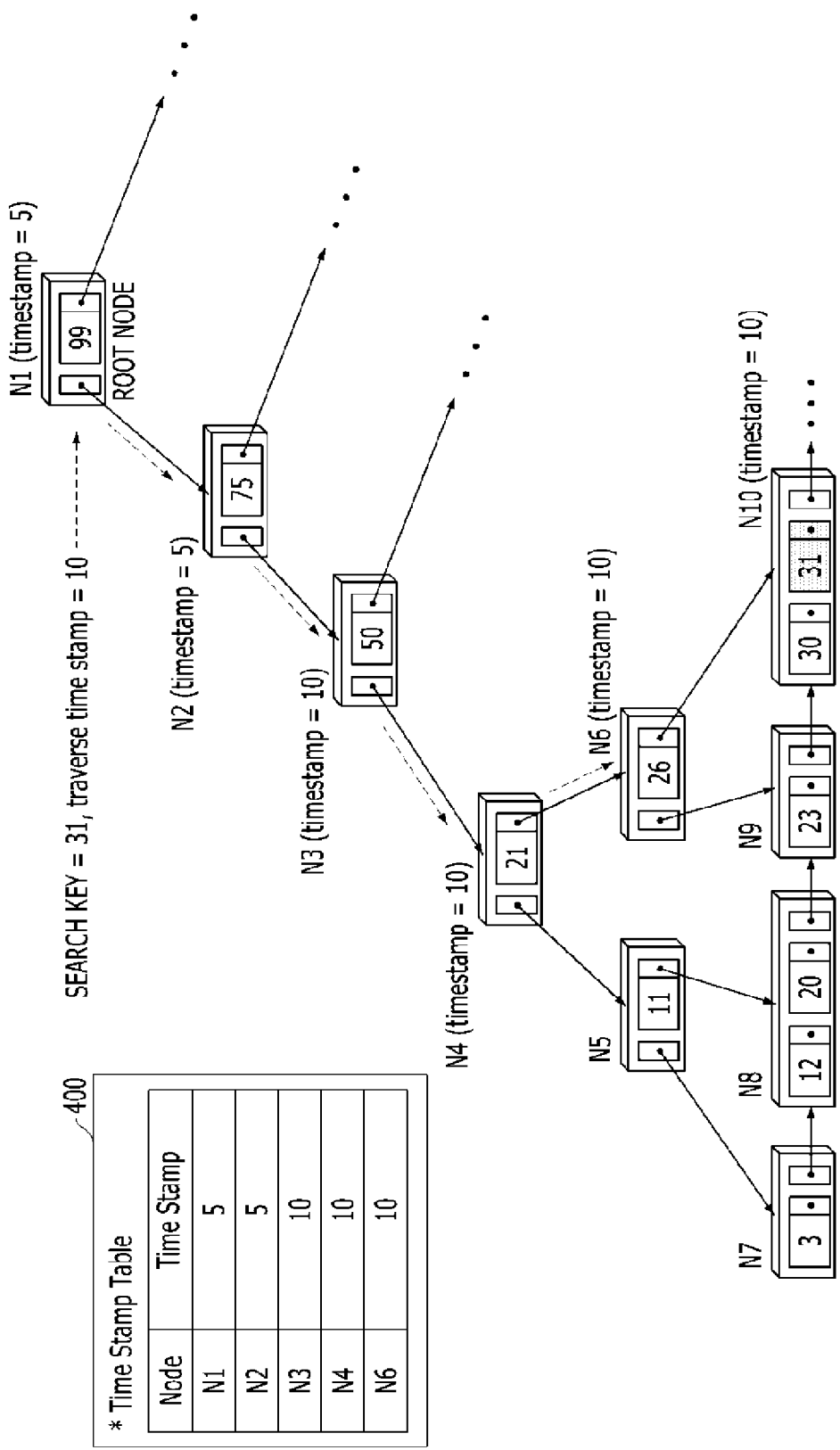
FIG. 3 is an exemplary diagram in which a processor performs index search through an index tree and a time stamp according to an exemplary embodiment of the present disclosure.

For example, as illustrated in FIG. 3, the processor 120 may determine a target index key value of "31" based on the query received from the client 200. Then, the processor 120 may determine the index search thread to search data having an index key value of "31" in the index tree 300. Accordingly, the index search thread may read an index key value of "99" by accessing a route node N1 including the lower direction lower link and the higher direction lower link together with the target index key value of "31". In addition, the index search thread compares "31" corresponding to the target index key value and "99" which is the index key value corresponding to node N1 which is the root node 310 to determine to perform the index search to node N2 in a lower direction among the child nodes. Further, the index search thread may access node N2 including "75" as the index key value along the lower direction lower link. In addition, the index search thread compares the target index key value of "31" and "75" which is the index key value of node N2 to determine to perform the index search to node N3 in the lower direction among the child nodes. In addition, the index search thread may access node N3 including "50" as the index key value along the lower direction lower link. Further, the index search thread compares the target index key value of "31" and "50" which is the index key value of node N3 node to determine to perform the index search to node N4 in the lower direction among the child nodes. In addition, the index search thread may access node N4 including "21" as the index key value along the lower direction lower link. Further, the index search thread compares the target index key value of "31" and "21" which is the index key value of node N4 to determine to perform the index search to node N6 in the higher direction among the child nodes. In addition, the index search thread may access node N6 including "26" as the index key value along the higher direction lower link. Further, the index search thread compares the target index key value of "31" and "26" which is the index key value of node N6 to determine to perform the index search to node N10 in the higher direction among the child nodes. Nodes N2, N3, N4, and N6 described herein may be connected to each other through the link and belong to the branch node 330 similarly, but have only a child-parent relationship. Accordingly, the index search thread may obtain a data address value corresponding to "31" which is the target index key value by accessing node N10 which is at the bottommost end in the structure of the index three 300. The detailed operation and numerical limitation of the aforementioned index search thread is just an example and the present disclosure is not limited thereto.

The processor 120 may set a traverse time stamp of the index search. The processor 120 may set the traverse time stamp in order to maintain the consistency of the index search and facilitate the search of the target index. More specifically, when the processor 120 receives the query issued from the client 200 to retrieve the target index key value, the processor 120 may assign the target index key value to the index search thread that performs the index search. The processor 120 may then generate the traverse time stamp based on the time that the index search thread assigns the search of the target index key value. In addition, the index search thread may perform the index search for the target index key until reaching the leaf node 350 which is the bottommost level from the root node 310 which is the topmost level of the index tree 300 via the branch node 330 based on the traverse time stamp.

The processor 120 may set an index time stamp based on modified time information for each node included in the index tree 300. More specifically, the processor 120 may modify each node included in the index tree 300. Here, the modification of the node may include modification (e.g., adding, deleting, and changing the index key value) of the index value included in the node or a structural change of the index tree 300. The structural change of the index tree 300 may include changes for indexes where a path of the index search may be changed. For example, the structural change of the index tree 300 may include at least one of deleting the node, splitting the node, and changing a node connection link. The description of the structural change of the index tree 300 is only an example, and the present disclosure is not limited thereto. The processor 120 may then generate the index time stamp for each node based on the time at which each node is modified. The index search thread may then perform the index search based on the traverse time stamp and the index time stamp of the search node.

The processor 120 may then determine whether to change the search path for the target index key based on the traverse time stamp and the index timestamp. More specifically, the processor 120 may determine to maintain the search path for the target index key when the traverse time stamp recorded in the index search thread is equal to or larger than the index time stamp of the search node. Further, the processor 120 may determine to change the search path for the target index key when the traverse time stamp is smaller than the index time stamp of the search node.

According to the exemplary embodiment, the processor 120 may determine whether the index search path needs to be changed when it is determined that the structural change of the index tree 300 occurs. More specifically, the processor 120 may allow the index search thread to reattempt the index search when it is determined that the structural change of the index tree 300 occurs. Further, the processor 120 may allow the index search thread to continuously perform the index search when it is not determined that the structural change of the index tree 300 occurs.

In addition, according to the exemplary embodiment, the processor 120 compares the traverse time stamp with the index time stamp of the search node to determine whether the structural change of the index tree 300 occurs. Further, the processor 120 may determine whether the index search path needs to be changed when it is determined that the structural change of the index tree 300 occurs.

The storage unit 140 according to an exemplary embodiment of the present disclosure may store predetermined data stored in relation with execution of a task by the database server 100. The storage unit 140 may include the DBMS 110 and/or the persistent storage 130. Additionally, the storage unit 140 may create a table (e.g., index table) and the like on the database server 100. For example, the creation of the tables may be performed by a separate component such as a control module (not illustrated). Further, the storage unit 140 may process and manage a request related to the storing (including the update) of the data. The storage unit 140 may decide to store the data and the index table. Further, the storage unit 140 may decide a storage location for the data and/or the index table. For example, the storage unit 140 may decide the storage location of the data on the data table. As another example, the storage unit 140 may decide the storage location of the data on the persistent storage 130. The storage unit 140 may store the created database index tree 300.

The storage unit 140 according to an exemplary embodiment of the present disclosure may store the database index tree 300 as illustrated in FIG. 2. Here, the database index tree 300 may be a form having a plurality of sub index structures hierarchically. The database index tree 300 stored in the storage unit 140 illustrated in FIG. 2 includes only one root node 310, one branch node 330, and two leaf nodes 350, but this is just an example for easy description and a predetermined number and a predetermined type of nodes may form the database index tree 300 without departing from the spirit of the present disclosure.

For example, a database index structure may include the root node in the topmost level and the leaf node in the bottommost level, and the branch node in a level between the root node and the leaf node. In the present disclosure, in respect to the parent node and the child node, among a plurality of nodes, a node in a higher level may be the parent node and a node in a lower level may be the child node. The parent node may include a link containing the address of the child node. The root node may be a node where the parent node does not exist and the leaf node may be a node where the child node does not exist.

According to an exemplary embodiment of the present disclosure, one or more parent nodes (e.g., root node 310 and/or branch node 330) of a plurality of sub index structures may include a start ROWID value of the sub index structure of a lower level thereof and an address value for accessing the sub index structure of the lower level. As a result, the parent node may point the child node(s), so that the index search from the higher level to the lower level in the index tree structure may be made. The processor 120 may verify a condition of each node and perform a calculation based on the condition at the time of performing the index search. The condition may represent whether the target index key value of a search target is included in a range of the index key value included in the node.

More specifically, when the processor 120 performs the index search from the root node 310, the processor 310 may use the index key included in the root node 310 as a branch value (i.e., a value for determining toward which branch node 330 the search needs to be performed) to the branch node 330 and determine the branch node 330 to perform the search based on an address (data block address (DBA) of the branch node 330. In addition, the processor 120 may determine the leaf node 350 to be searched among the leaf nodes 350 in the same scheme even in the branch node 330.

According to an exemplary embodiment of the present disclosure, the search node may include a node read by the index search thread of the nodes included in the index tree 300. More specifically, the processor 120 may determine to perform the index search by reading from the root node 310 of the index tree 300 by the index search thread. The index search thread may then read one or more of the root node 310, the branch node 330, and the leaf node 350 and search the target index key. In addition, the search node may include a node which the index search thread reads to search the target index key and a node which the index search thread is reading.

Accordingly, the processor 120 according to an exemplary embodiment of the present disclosure may minimize an interval for returning for re-searching in the search path and reattempt the search in a nearest node even though the structure of the index tree 300 is changed by another thread based on the traverse time stamp recorded in the process in which the index search thread starts the search for the target index key value, the index time stamp obtained in the process of the index search, and a time stamp table in which the value of the index time stamp is recorded. In addition, in this way, it is possible to greatly reduce a search interval required for the re-search in a concurrent work environment, thereby drastically reducing an overall index search time.

With this feature, it is possible to efficiently enhance the performance of the database system 10 by enhancing a data processing speed of the computing device and enhancing the concurrency of the work while ensuring the consistency of the index structure in the concurrent work environment.

FIG. 3 is an exemplary diagram in which a processor performs index search through an index tree and a time stamp according to an exemplary embodiment of the present disclosure.

The processor 120 may set the traverse time stamp of the index search for searching the target index key. More specifically, when the processor 120 receives the query issued from the client 200 to retrieve the target index key value, the processor 120 may assign the target index key value to the index search thread that performs the index search. The processor 120 may then generate the traverse time stamp based on the time when the search of the target index key value is assigned to the index search thread. In addition, the index search thread may perform the index search for the target index key until reaching the leaf node 350 which is at the bottommost level from the root node 310 which is the node at the topmost level of the index tree 300 via the branch node 330 based on the traverse time stamp.

The processor 120 may set an index time stamp based on modified time information for each node included in the index tree 300. More specifically, the processor 120 may modify each node included in the index tree 300. Here, the modification of the node may include modification (e.g., adding, deleting, and changing the index key value) of the index value included in the node or a structural change of the index tree 300. The structural change of the index tree 300 may include changes for indexes where a path of the index search may be changed. For example, the structural change of the index tree 300 may include at least one of deleting the node, splitting the node, and changing a node connection link. The description of the structural change of the index tree 300 is only an example, and the present disclosure is not limited thereto. The processor 120 may then generate the index time stamp for each node based on the time at which each node is modified. The index search thread may then perform the index search based on the traverse time stamp and the index time stamp of the search node.

According to an exemplary embodiment of the present disclosure, the processor 120 may search the index tree from the root node. The processor 120 may search the index tree 300 along a link connected from the root node 310 of the index tree 300 to the leaf node 350. Here, a direction from the root node 310 to the leaf node 350 may indicate a direction from the topmost level to the bottommost level of the index tree 300. Accordingly, the index search thread may perform the index search from the root node 310 to the branch node 330 and from the branch node 330 to the leaf node 350.

The processor 120 may search the index tree from the parent node to the child node along the link connected to the child node. The processor 120 compares the index key value included in each index node and the target index key value to determine a link to perform the search. In addition, the processor 120 may perform the index search to one of child nodes connected to the search node through the lower link.

According to an exemplary embodiment of the present disclosure, the processor 120 accesses the root node 310 in the topmost level to compare the index key value included in the root node 310 with the target index key value to be searched. In addition, the processor 120 may perform the index search to the lower direction branch node 330 connected to the lower direction lower link when the target index key is a value less than the key having the minimum value among the keys in the root node 310. Further, the processor 120 may perform the index search to the higher direction branch node connected to the higher direction lower link when the target index key is a value larger than the key having the maximum value among the keys in the root node 310. Further, according to the exemplary embodiment, the processor 120 may perform the index search to the middle direction branch node connected to the middle direction lower link when the target index key is a value larger than the key having the minimum value and smaller than the key having the maximum value among the keys in the root node 310 and is a value not included in the root node 310. In addition, the processor 120 may determine the leaf node 350 to be searched by performing the same operation by accessing the branch node 330.

For example, as illustrated in FIG. 3, the processor 120 may determine a target index key value of "31" based on the query received from the client 200. Then, the processor 120 may determine the index search thread to search data having an index key value of "31" in the index tree 300. Accordingly, the index search thread may read an index key of "99" by accessing node N1 which is the root node 310 together with the target index key value of "31". Here, node N1 may be connected to two child nodes through the lower direction lower link and the higher direction lower link, respectively. In addition, the index search thread compares "31" corresponding to the target index key value and "99" which is the index key value corresponding to node N1 to determine to perform the index search to node N2 in a lower direction among the child nodes. Further, the index search thread may access the N2 node including "75" as the index key value along the lower direction lower link. In addition, the index search thread compares the target index key value of "31" and "75 which is the index key value of the N2 node to determine to perform the index search to node N3 in the lower direction among the child nodes of node N2. In addition, the index search thread may access node N3 including "50" as the index key value along the lower direction lower link. Further, the index search thread compares the target index key value of "31" and "50" which is the index key value of node N3 node to determine to perform the index search to node N4 in the lower direction among the child nodes of node N3. In addition, the index search thread may access node N4 including "21" as the index key value along the lower direction lower link. Further, the index search thread compares the target index key value of "31" and "21" which is the index key value of node N4 to determine to perform the index search to node N6 in the higher direction among the child nodes of node N4. In addition, the index search thread may access node N6 including "26" as the index key value along the higher direction lower link. Further, the index search thread compares the target index key value of "31" and "26" which is the index key value of node N6 to determine to perform the index search to node N10 in the higher direction among the child nodes of node N6. Nodes N2, N3, N4, and N6 described herein may be connected to each other through the link and belong to the branch node 330 similarly, but have only a child-parent relationship. Accordingly, the index search thread may obtain a data address value from "31" which is the target index key value by accessing node N10 which is at the bottommost end in the structure of the index three 300. The detailed operation and numerical limitation of the aforementioned index search thread is just an example and the present disclosure is not limited thereto.

The processor 120 may then write in the time stamp table 400 at least one index time stamp of the root node 310, the branch node 330, and the leaf node 350 searched in the index search. More specifically, the processor 120 may generate a traverse time index based on the time that the target index key is assigned to the index search thread. Further, the processor 120 may allow the index search thread to obtain the index time stamp of the root node 310 while reading the root node 310 in order to start the index search for the target index key. In addition, the processor 120 may write the obtained index time stamp of the root node 310 in the time stamp table 400. As a result, the processor 120 may determine a time when last modification for the root node 310 occurs. Further, the processor 120 compares the index key of the root node 310 and the target index key to determine one of the child nodes connected to the root node 310 through the link as the search path. In addition, the processor 120 may allow the index search thread to obtain the index time stamp of the corresponding node while reading the child node (e.g., branch node 330) determined as the search path. In addition, the processor 120 may write the obtained index time stamp of the child node in the time stamp table 400. As a result, the processor 120 may determine a time when last modification for the root node 310 and the child node (e.g., branch node) occurs. That is, the processor 120 may obtain the index time stamp of all nodes which the index search thread reads while performing the index search for the target index key (i.e., the search node) and write the obtained index time stamp in the time stamp table 400.

Here, the processor 120 may be capable of performing an operation in which the index search thread reads the search node and compares the target index key and the index key of the search node and an operation in which the index search thread reads the search node and obtains the index time stamp and writes the obtained index time stamp in the time stamp table 400 regardless of a pre/post process.

The processor 120 according to an exemplary embodiment of the present disclosure may match the index time stamp read in at least one of the root node 310, the branch node 330, and the leaf node 350 with each node identifier and write the corresponding index time stamp matched with each node identifier in the time stamp table 400. More specifically, all nodes included in the index tree 300 may include a node identifier capable of identifying each node. Here, the node identifier includes at least one of a name of the node, a storage location of the node, and relationship information between the nodes to allow the processor 120 to identify the corresponding node through the node identifier. For example, when the index tree 300 is located in the storage unit 140, the node identifier may include a location of the node on the storage unit as the node identifier. The description of the node identifier is just an example and the present disclosure is not limited thereto. The processor 120 may match the node identifier of the search node read by the index search thread and the index time stamp with each other and write the matched node identifier and index time stamp in the time stamp table 400.

For example, as illustrated in FIG. 3, the processor 120 may generate a traverse time stamp of "10" based on the time when the index search thread initiates reading the root node 310. The processor 120 may then match an identifier "N1" of the root node 310 which the index search thread obtains while reading the root node 310 and "5" which is the index time stamp of the root node 310 and write the matched "N1" and "5" in the time stamp table 400. Further, the processor 120 compares the index key of the root node 310 and the target index key to determine the branch node 330 to be searched next. In addition, the processor 120 may allow the index search thread to access the branch node 330 through the lower link. Further, the processor 120 may match an identifier "N2 of the branch node 330 which the index search thread obtains while reading the branch node 330 and "5" which is the index time stamp of the branch node 330 and write the matched "N2" and "5" in the time stamp table 400. By repeatedly performing the same process described above, the processor 120 may match the node identifier of the search node which the index search thread reads on the search path and the index time stamp obtained in each node and write the matched node identifier and index time stamp in the time stamp table 400 like "N1" and "5", "N2" and "5", "N3" and "10", "N4" and "10", and "N6" and "10" as shown in the time stamp table 400 of FIG. 3. The detailed description of the node identifier and index time table described above is just an example and the present disclosure is not limited thereto.

Accordingly, when the processor 120 performs the re-search for the target index key, the processor 120 may determine whether each node is changed up to a re-search time by referring to the time stamp table 400. In addition, the processor 120 may determine as a start node of the re-search one of previous search nodes which are not changed after the search.

The processor 120 according to an exemplary embodiment of the present disclosure may write in the timestamp table 400 an index time stamp from a current search node to a pre-set number of previous search nodes among the search nodes read in the index search. More specifically, the processor 120 may set the number of nodes to be written in the time stamp table 400 in advance. For example, the processor 120 may set the index time stamps for three nodes to be held in the time stamp table 400. In addition, the processor 120 write in the time stamp table 400 the node identifier and the index time stamp of the current search node obtained by the index search thread and the node identifiers and the index time stamps for two previous search nodes of the current search node. The detailed description of setting of the number of time stamp tables 400 is just an example and the present disclosure is not limited thereto.

The processor 120 according to an exemplary embodiment of the present disclosure may delete one or more index time stamps written in the time stamp table 400 based on a predetermined criterion. More specifically, in the processor 120, the index search thread may additionally obtain the index time stamp for the search node in a state where a predetermined number of index timestamps are written in the time stamp table 400. In this case, the processor 120 may determine to delete at least one of the index time stamps written in the time stamp table 400 based on the predetermined criterion. Here, in the predetermined criterion, the index time stamp in which the time when the index search thread obtains the index time stamp is earliest may be deleted or the index time stamp for the topmost-level node may be deleted in the structure of the index tree 300. That is, the processor 120 may maintain the number of index time stamps written in the time stamp table 400 at a predetermined level.

As a result, the processor 120 may write information required for determining the re-search start node even while maintaining a size of the time stamp table which may be indefinitely increased as the search path becomes longer at a predetermined level.

The processor 120 may determine whether to change the search path for the target index key based on the traverse time stamp and the index time stamp. More specifically, the processor 120 may determine to maintain the search path for the target index key when the traverse time stamp recorded in the index search thread is equal to or larger than the index timestamp of the search node. Further, the processor 120 may determine that the index tree is changed after initiating the search for the index and determine to change the search path for the target index key when the traverse time stamp is smaller than the index time stamp of the search node. The detailed description thereof will be described below with reference to FIG. 5.

Accordingly, the processor 120 according to an exemplary embodiment of the present disclosure may minimize an interval for returning for re-searching in the search path and reattempt the search in a nearest node even though the structure of the index tree 300 is changed by another thread based on the traverse time stamp recorded in the process in which the index search thread starts the search for the target index key value, the index time stamp obtained in the process of the index search, and a time stamp table in which the value of the index time stamp is written. In addition, in this way, it is possible to greatly reduce a search interval required for the re-search in a concurrent work environment, thereby drastically reducing an overall index search time.

With this feature, it is possible to efficiently enhance the performance of the database system 10 by enhancing a data processing speed of the computing device and enhancing the concurrency of the work while ensuring the consistency of the index structure in the concurrent work environment.

Figure 4:
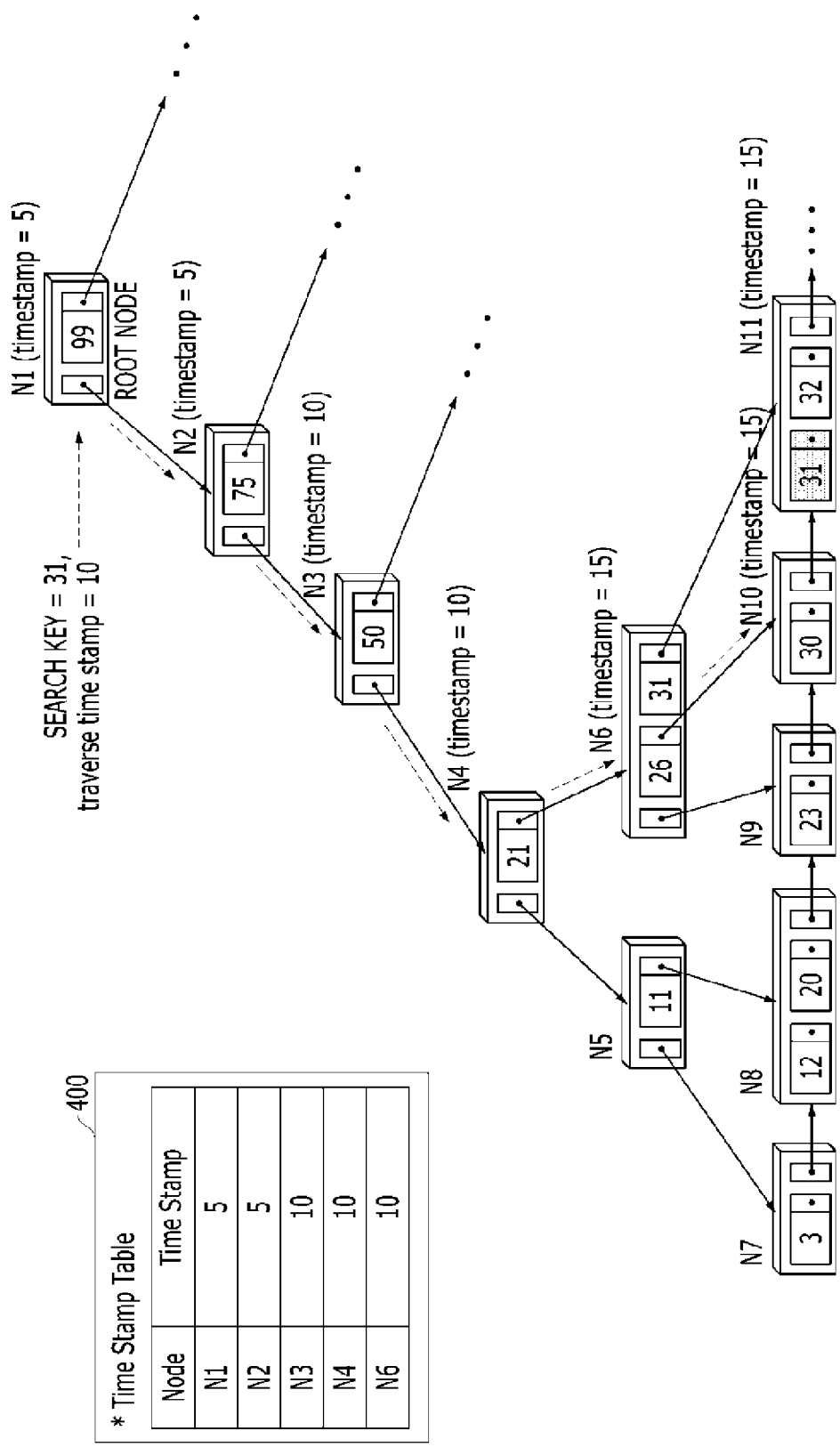
FIG. 4 is an exemplary diagram of a structural change of an index tree according to an exemplary embodiment of the present disclosure.

FIG. 4 is an exemplary diagram of a structural change of an index tree 300 according to an exemplary embodiment of the present disclosure.

The structural change of the index tree 300 according to an exemplary embodiment of the present disclosure may include changes for indexes where the path of the index search may be changed. For example, the structural change of the index tree 300 may include at least one of splitting the node, inserting the key value in the node, deleting the key value from the node, changing the key value in the node, and changing the node connection link.

For example, the index tree 300 may be constituted by two child nodes (nodes N9 and N10) of node N6, as illustrated in FIG. 3. In addition, the processor 120 inserts a new index key value into node N6 in the index tree 300 and splits node N10 to change the structure of the index tree 300. As a result, the processor 120 may allow the index tree 300 to be connected to three child nodes, i.e., nodes N9, N10, and N11 in one node N6 as illustrated in FIG. 4. The structural change of the index tree 300 described above is just an example, and the present disclosure is not limited thereto.

The processor 120 may update the index time stamp of the corresponding node according to the time when each node included in the index tree 300 is modified. When the index tree is changed after initiating the index search, the index time stamp of the corresponding node may be updated and the processor 120 may determine whether to change the path of the index search based on the index time stamp.

Further, according to the exemplary embodiment, the processor 120 may determine whether the path of the index search is changed based on the contents of the search node. More specifically, the processor 120 reads the contents of the search node to determine whether the search path to the current search node for searching the target index key is still valid.

Here, a method by which the processor 120 determines the contents of the search node may include various aspects used to carry out the index search in the B-tree index structure in the related art. For example, the processor 120 may obtain bound information of the search node when the index search thread accesses the node. The bound information may include the range of the index key value that may be included in the search node. That is, the bound information may include the range of the index key value that may be included in the current search node or reached when continuing the search along the current search node and may be determined based on the index key value of the current search node and the index key value of the parent node of the current search node.

In addition, the processor 120 may determine whether the search path for the target index key needs to be changed based on bound information including at least one information of the minimum value and the maximum value of the index key which may be included in the search node and the target index key. Further, the processor 120 may determine to maintain the search path for the target index key when the value of the target index key falls within the bound information. Further, the processor 120 may determine to change the search path for the target index key when the value of the target index key does not fall within the bound information.

The method for determining whether to change the path of the index search in the search node of the processor 120 is just an example and the present disclosure is not limited thereto. The detailed description thereof will be described below with reference to FIG. 5.

The processor 120 according to an exemplary embodiment of the present disclosure may update the traverse time stamp when determining to maintain the current search path for the target index key. More specifically, the processor 120 may determine whether to maintain the search path based on the contents of the search node. In addition, the processor 120 may update the traverse time stamp assigned to the index search thread to correspond to the index timestamp of the current node when determining to maintain the search path. Accordingly, the updated traverse time stamp may be issued so as to be continuously equal to or larger than the index time stamp of the search node which is being currently searched.

The processor 120 according to an exemplary embodiment of the present disclosure may update the traverse time stamp when determining to change the search path for the target index key because a traverse condition is not established. More specifically, when the processor 120 determines to change the search path, the processor 120 may update the traverse time stamp assigned to the index search thread at the corresponding time. According to the exemplary embodiment, the processor 120 may update the traverse time stamp based on the time when the index search thread stops the search for the target index key.

The processor 120 according to another exemplary embodiment of the present disclosure may update the traverse time stamp based on time information at which the index search thread initiates the read of the start node of the re-search. The processor 120 may determine a re-search start node to start the re-search based on the index timestamp of the search node and the timestamp table 400. In addition, the processor 120 may reissue the traverse time stamp corresponding to the time when the index search thread initiates the re-search, i.e., the time when the index search thread reads the start node of the re-search.

The processor 120 may determine the start node of the re-search at least partially based on the time stamp table 400. More specifically, the processor 120 may obtain the index time stamps of the nodes which the index search thread reads to search the target index key, i.e., the search nodes. In addition, the processor 120 may match the identifier (e.g., a node name, a node address, etc.) of each node and the index time stamp of the corresponding node and write the matched identifier and index time stamp in the time stamp table 400. According to the exemplary embodiment, the processor 120 may set the number of nodes to be written in the time stamp table 400 and manage the time stamp table 400 according to the set number. Further, according to the exemplary embodiment, the processor 120 may delete the node identifier and the index time stamp written in the time stamp table 400.

The processor 120 according to an exemplary embodiment of the present disclosure may determine whether each previous search node written in the time stamp table 400 is changed after the search. Here, the processor 120 may determine whether each of the previous search nodes is changed after the search by comparing the index time stamp of each previous search node written in the time stamp table 400 and each previous search node read at the time of the re-search with each other. In addition, the processor 120 may determine as the start node of the re-search one of previous search nodes which are not changed after the search among the previous search nodes. The detailed description thereof will be described below with reference to FIG. 5.

Accordingly, the processor 120 according to an exemplary embodiment of the present disclosure may minimize an interval for returning for re-searching in the search path and reattempt the search in a nearest node even though the structure of the index tree 300 is changed by another thread based on the traverse time stamp recorded in the process in which the index search thread starts the search for the target index key value, the index time stamp obtained in the process of the index search, and a time stamp table in which the value of the index time stamp is written. In addition, in this way, it is possible to greatly reduce a search interval required for the re-search in a concurrent work environment, thereby drastically reducing an overall index search time.

With this feature, it is possible to efficiently enhance the performance of the database system 10 by enhancing a data processing speed of the computing device and enhancing the concurrency of the work while ensuring the consistency of the index structure in the concurrent work environment.

Figure 5:
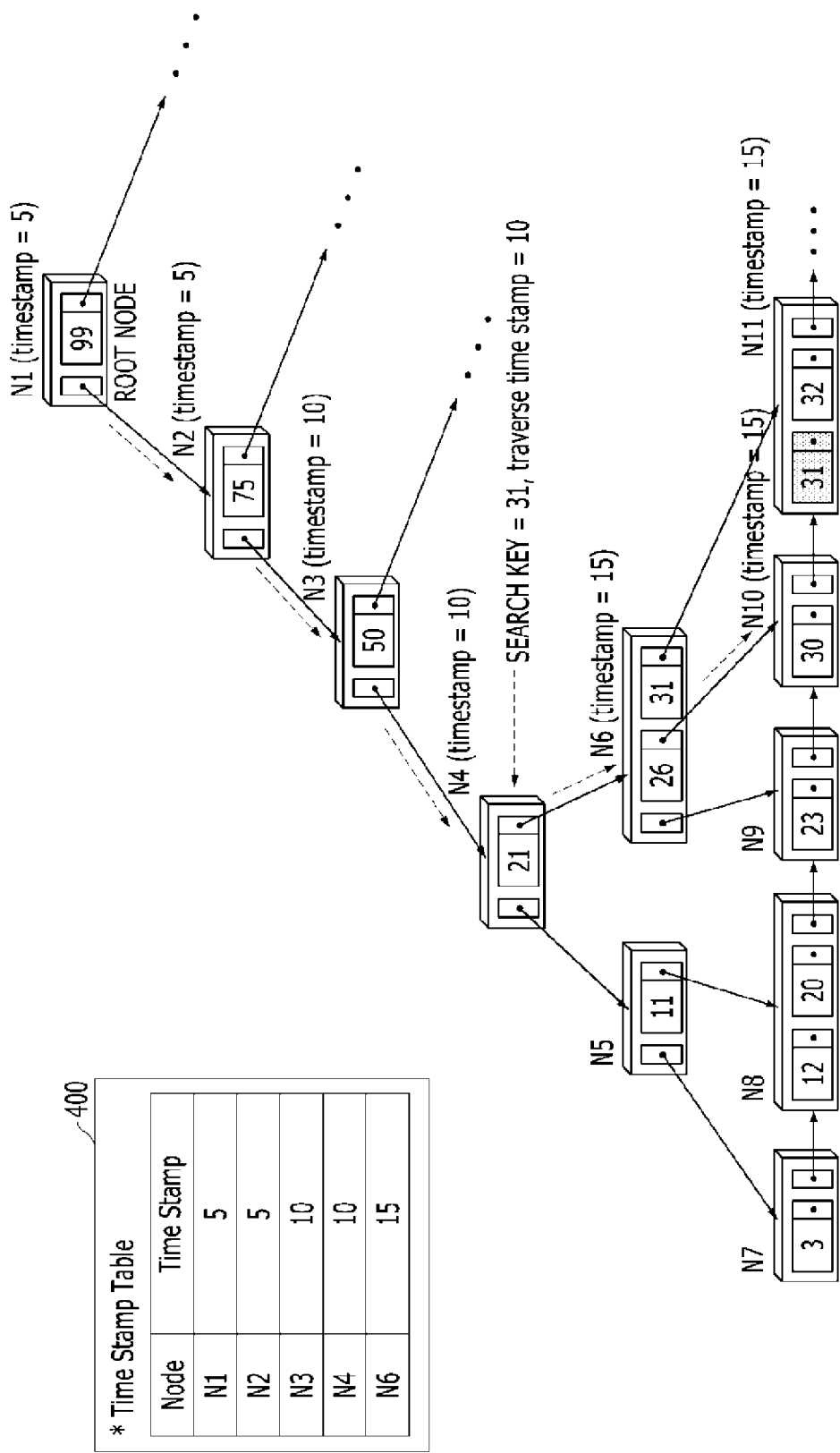
FIG. 5 is an exemplary diagram of re-search depending on the change of the structure of the index tree according to an exemplary embodiment of the present disclosure.

FIG. 5 is an exemplary diagram of re-search depending on the change of the structure of the index tree according to an exemplary embodiment of the present disclosure.

The processor 120 may determine whether to change the search path for the target index key based on the traverse time stamp and the index time stamp. The processor 120 may determine whether to change the search path for the target index key by comparing the traverse time stamp and the index time stamp of the search node.

More specifically, the processor 120 according to an exemplary embodiment of the present disclosure may determine to maintain the search path for the target index key when the traverse time stamp is equal to or larger than the index timestamp of the search node. That is, the processor 120 regards that there is no change to the index tree after starting the index search to continuously perform the index search.

For example, as illustrated in FIG. 3, the traverse time stamp assigned to the index search thread for searching the target index key "31" may be 10 and the index time stamp which the index search thread obtains in node N6 may be "10". In this case, the processor 120 may determine to maintain the search path for the target index key based on a fact that the traverse time index "10" assigned to the index search thread is equal to the index time stamp "10" of node N6. That is, the processor 120 may determine that node N6 is not modified and determine to maintain the search path for the target index key after the search for the target index key starts. A numerical comparison of the target index key and the index time stamp described above is just an example and the present disclosure is not limited thereto.

The processor 120 according to an exemplary embodiment of the present disclosure may determine to change the search path for the target index key when the traverse time stamp is smaller than the index time stamp of the search node. That is, the processor 120 may detect that there is a change for the index tree after initiating the index search based on the comparison of the index time stamp and the traverse time stamp. For example, as illustrated in FIG. 4, the traverse time stamp assigned to the index search thread for searching the target index key "31" may be 10 and the index time stamp which the index search thread obtains in node N6 may be "15". In this case, the processor 120 may determine to change the search path for the target index key based on a fact that the traverse time index "10" assigned to the index search thread is smaller than the index time stamp "15" of node N6. That is, the processor 120 may determine that node N6 is modified and determine to change the search path for the target index key after the search for the target index key starts. The numerical comparison of the target index key and the index time stamp described above is just an example and the present disclosure is not limited thereto.

The processor 120 may determine whether the path of the index search for the target index key is changed based on the contents of the search node. The processor 120 reads the contents of the search node to determine whether the search path to the current search node for searching the target index key is still valid. More specifically, the processor 120 may determine whether the search path up to the search node is valid by reading the contents of the current search node when the traverse time stamp is smaller than the index time stamp of the current search node. Thus, when the index time stamp of the current search node is a value larger than the traverse time stamp, that is, when the current search node is modified after the traverse starts, the processor 120 may determine whether modifications influence the search path based on index related information included in the current search node. In addition, the current search node is modified, but when the processor 120 determines that the current search node does not influence the path for searching the target index key, the processor 120 may determine to maintain the search path. In addition, when the processor 120 determines that the modification of the current search node influences the path for searching the target index key, the processor 120 may determine to change the search path.

Here, a method by which the processor 120 determines the contents of the search node may include various aspects used to carry out the index search in the B-tree index structure in the related art. According to an exemplary embodiment of the present disclosure, the processor 120 may determine whether the path for the index search is changed based on the bound information and the target index key. More specifically, in the processor 120, the index search thread may obtain the bound information of the corresponding search node by accessing the current search node. Here, the bound information may include at least one information of the minimum value and the maximum value of the index key which may be included in the search node for the search node. Further, here, the bound information may include at least one of an upper bound key meaning the maximum value among index keys which may be obtained when performing the search along the link of the search node and a lower bound key meaning the minimum value among the index keys which may be obtained when performing the search along the link of the search node. That is, the upper bound key and the lower bound key may be boundaries for determining the index key value which may be included in the corresponding search node and a lower link node of the corresponding search node in the index tree structure. The processor 120 may determine at least one of the upper bound key and the lower bound key for each node when the structure of the index tree is changed. In addition, the processor 120 may update the upper bound and/or lower bound information of the nodes related to a structure change operation of an index structure change thread.

The processor 120 may determine whether the search path for the target index key is changed based on the contents of the search node. The processor 120 may determine whether the search path for the target index key needs to be changed based on the target index key and the bound information. More specifically, the processor 120 may determine that the value of the target index key falls within the bound information when only information on the upper bound key is obtained in the current search node and when the target index key value is smaller than the upper bound key, only information on the lower bound key is obtained in the current search node and the target index key value is larger than the lower bound key, or both information on the upper and lower bound keys is obtained and the target index key falls within a range between the upper bound key and the lower bound key. As a result, the processor 120 may determine to maintain the search path for the target index key when the value of the target index key falls within the bound information. Further, the processor 120 may determine to change the search path for the target index key when the value of the target index key does not fall within the bound information.

As a result, the processor 120 may determine to maintain the index search path based on the bound information of the current search node even when the traverse time stamp is smaller than the index time stamp of the current search node. That is, although the index search path is changed after the current search node starts the traverse, the processor 120 may determine whether the changed index search path does not influence the path for searching the target index key. In this case, the processor 120 compares the bound information of the current search node with the target index key to determine once again whether to maintain or change the index search path. Thus, the processor 120 may continue to perform the index search from the node currently being searched, without unconditionally resuming the index search from the root node even though the traverse timestamp is smaller than the index timestamp. The method for determining whether to change the path of the index search in the search node of the processor 120 is just an example and the present disclosure is not limited thereto.

The processor 120 according to an exemplary embodiment of the present disclosure may update the traverse time stamp when determining to maintain the search path for the target index key. More specifically, the processor 120 may determine to maintain the search path based on a fact that the traverse time stamp is equal to or larger than the index time stamp of the current search node. In addition, the processor 120 may update the traverse time stamp assigned to the index search thread to correspond to the index time stamp of the current node. Accordingly, the updated traverse time stamp may be issued so as to be continuously equal to or larger than the index time stamp of the search node which is being currently searched. Therefore, by making the search of the search path up to the time stamp of the current search node valid, the processor 120 may prevent overhead of determining whether to change the index tree unnecessary while continuing the search.

The processor 120 may determine to change the search path based on a fact that the traverse time stamp is smaller than the index time stamp of the current search node. In addition, the processor 120 compares the bound information of the current search node and the target index key to determine to maintain the search path for the target index key when the value of the target index key is included in an interval where the upper bound key and/or lower bound key are/is formed. Further, the processor 120 may update the traverse time stamp to the index time stamp of the current search node when determining to maintain the search path for the target index key. Accordingly, the processor 120 determines a change which does not influence the search path among the structural changes for the current search node to maintain the index search through the updated traverse time stamp without starting the re-search in the previous search node.

The processor 120 according to an exemplary embodiment of the present disclosure may update the traverse time stamp when determining to change the search path for the target index key. More specifically, the processor 120 may determine to change the search path by comparing the traverse time stamp assigned to the index search thread and the index timestamp of the search node. In addition, when the processor 120 determines to change the search path, the processor 120 may issue a new traverse time stamp for searching the target index key in the changed index tree 300 to the index search thread. Here, the newly issued traverse time stamp may be issued so as to be equal to or larger than the index time stamp of the search node which is being currently searched. For example, a newly assigned traverse time stamp may be set at the re-search resume time.

Accordingly, when the index search thread starts the re-search and reads the search node before the re-search starts again, the processor 120 may prevent a problem that the re-search needs to be performed again because the newly issued traverse time stamp is smaller than the current index time stamp.

More specifically, the processor 120 according to an exemplary embodiment of the present disclosure may update the traverse time stamp based on information on the time of comparing the traverse time stamp and the index time stamp of the search node. In addition, the processor 120 may reissue the traverse time stamp corresponding to the time when the index search thread determines to change the search path, i.e., the time when the index search thread stops the search for the target index key.

The processor 120 according to another exemplary embodiment of the present disclosure may update the traverse time stamp based on time information at which the index search thread initiates the read of the start node of the re-search. The processor 120 may determine a re-search start node to start the re-search based on the index timestamp of the search node and the timestamp table 400. In addition, the processor 120 may reissue the traverse time stamp corresponding to the time when the index search thread initiates the re-search, i.e., the time when the index search thread reads the start node of the re-search. The detailed description thereof will be made below with reference to FIG. 6.

Accordingly, since the processor 120 may update the reissued traverse time stamp as high as possible, it is possible to reduce a probability that the traverse time stamp will be smaller than the index time stamps of the search nodes included in the index tree 300 in the subsequent re-search process.

The processor 120 may determine the start node of the re-search at least partially based on the time stamp table 400. More specifically, the processor 120 may obtain the index time stamps of the nodes which the index search thread reads to search the target index key, i.e., the search nodes. In addition, the processor 120 may match the identifier (e.g., a node name, a node address, etc.) of each node and the index time stamp of the corresponding node and write the matched identifier and index time stamp in the time stamp table 400. According to the exemplary embodiment, the processor 120 may set the number of nodes to be written in the time stamp table 400 and manage the time stamp table 400 according to the set number. Further, according to the exemplary embodiment, the processor 120 may delete the node identifier and the index time stamp written in the time stamp table 400.

The processor 120 according to an exemplary embodiment of the present disclosure may determine whether each previous search node written in the time stamp table 400 is changed after the search. Here, the processor 120 may determine whether each of the previous search nodes is changed after the search by comparing the index time stamp of each previous search node written in the time stamp table 400 and each previous search node read at the time of the re-search with each other. In addition, the processor 120 may determine as the start node of the re-search one of previous search nodes which are not changed after the search among the previous search nodes. More specifically, the processor 120 may match and store the node identifier and the index time stamp for the search node in the time stamp table 400.

Further, the processor 120 may determine to change the search path for the target index key when the traverse time stamp is smaller than the index time stamp of the search node. Accordingly, the processor 120 may obtain the index time stamp again by reading each previous search node included in the search path based on the address of the previous search node obtained from the time stamp table 400 in order to perform the re-search for the target index key.

For example, the processor 120 may determine that the search path for the target index key needs to be changed based on a fact that the index timestamp "15" obtained in N6 is larger than the traverse time stamp "10" assigned to the index search thread, as illustrated in FIG. 5. The processor 120 may then again access node N4 that is searched before N6 based on the node identifier (e.g., DBA for each previous search node) written in the time stamp table 400. In addition, the processor 120 may obtain the index time stamp "10" again by reading node N4. Further, the processor 120 may determine that node N4 is not changed after the previous search based on a fact that the index time stamp "10" matched with the node identifier of node N4 and stored in the time stamp table 400 and the index time stamp "10" which is obtained again are equal to each other. Further, according to the exemplary embodiment, the processor 120 may obtain the index time stamps at the time of the re-search again by reading at least two of the previous search nodes written in the time stamp table 400.

In another exemplary embodiment, the processor 120 may perform re-access to the previous search node from the previous search node adjacent to the current search node among the previous search nodes written in the time stamp table 400, obtain of the current time stamp of the previous search node, and a comparison operation with the time stamp of the corresponding previous search node written in the time stamp table 400. That is, after first determining whether the nearest node of the current search node is changed after the search, the processor 120 may determine whether a higher node of the nearest node of the current search node is changed after the search when the nearest node of the current search node is changed after the search.

Through such a process, the processor 120 may minimize a return degree at the time of resetting the path by searching a node which is not changed after the search (i.e., in which the search up to the corresponding node is valid) from a node close to the current search node when resetting the search path is required. In addition, the processor 120 may compare the index time stamp obtained again and the index time stamp stored in the time stamp table 400. The detailed description regarding the determination whether to change the search node by the processor 120 is just an example and the present disclosure is not limited thereto.

Accordingly, the processor 120 may determine a previous search node which is not changed after the search among the previous search nodes of the search path for the target index key. In addition, the processor 120 may determine as a start node of the re-search one of previous search nodes which are not changed after the search.

The processor 120 according to an exemplary embodiment of the present disclosure may determine as the start node of the re-search the nearest node to the current search node among the previous search nodes which are not changed after the search. More specifically, the processor 120 may determine whether one or more previous search nodes written in the time stamp table 400 are changed after the search. In addition, the processor 120 may determine whether the previous search nodes are changed after the search by returning to a past search path, i.e., in a reverse order of the search path from the search node which is just previously searched among the previous search nodes. Then, the processor 120 may determine as the start node of the re-search a node closest to the current search node, i.e., an existing search node of which search is terminated among one or more search nodes which are not changed after the search time.

Here, the processor 120 may determine the search node as the start node of the re-search when the node which is just previously searched among the previous search nodes is not changed after the search according to the exemplary embodiment. In addition, according to another exemplary embodiment, the processor 120 may determine whether one or more search nodes written in the time stamp table 400 are changed after the search and then, determine the nearest node among the unchanged nodes as the start node of the re-search.

For example, as illustrated in FIG. 5, when the processor 120 determines that the search path needs to be changed in node N6, the processor 120 may read the immediately previously searched node, i.e., the nearest search node N4 among the previous search nodes. Further, the processor 120 may determine that node N4 is not changed after the search based on the fact that "10" matched with the identifier of node N4 and stored in the time stamp table 400 and the index time stamp "10" which is obtained again are equal to each other. Accordingly, the processor 120 may determine N4 as the start node of the re-search. Further, in another example, the processor 120 may determine that node N4 is not changed and then, access nodes N1, N2, and N3 written in the time stamp table 400 and determine whether the corresponding nodes are changed. In addition, the processor 120 may determine node N4 as the start node of the re-search based on a fact that all of nodes N1, N2, N3, and N4 are not changed and a fact that N4 among the unchanged nodes is closest to node N6 of which search is stopped. In another example, the processor 120 may determine whether only the previous search node which passes a predetermined criterion (e.g., a value limit of the index time stamp) among the previous search nodes written in the time stamp table 400 is changed after the search. The determination of the re-search node by the processor 120 described above is just an example and the present disclosure is not limited thereto.

Additionally, the processor 120 according to an exemplary embodiment of the present disclosure may determine as the start node of the re-search a node which is most recently changed among the previous search nodes which are not changed after the search. More specifically, the processor 120 may determine whether one or more previous search nodes written in the time stamp table 400 are changed after the search. Then, the processor 120 may determine as the start node of the re-search a node having the largest index time stamp value among one or more previous search nodes which are not changed after the search time. That is, the processor 120 may determine whether to change at least some of the previous search nodes stored in the time stamp table 400 after the search and determine whether the most recently changed search node among the previous search nodes which are not changed after the search as the start node of the re-search.

The processor 120 according to an exemplary embodiment of the present disclosure may determine as the start node of the re-search the nearest search node when the number of nodes which are most recently changed among the previous search nodes which are not changed after the search are 2 or more. More specifically, the processor 120 may determine whether one or more previous search nodes written in the time stamp table 400 are changed after the search. Then, the processor 120 may determine as the start node of the re-search a node having the largest index time stamp value among one or more previous search nodes which are not changed after the search time. Here, a plurality of nodes having the largest index time stamp value may exist. In this case, the processor 120 may determine as the start node of the re-search a node closest to the current search node, i.e., an existing search node of which search is terminated among one or more search nodes which are not changed after the search time.

Accordingly, the processor 120 according to an exemplary embodiment of the present disclosure may minimize an interval for returning for re-searching in the search path and reattempt the search in a nearest node even though the structure of the index tree 300 is changed by another thread based on the traverse time stamp recorded in the process in which the index search thread starts the search for the target index key value, the index time stamp obtained in the process of the index search, and a time stamp table in which the value of the index time stamp is written. In addition, in this way, it is possible to greatly reduce a search interval required for the re-search in a concurrent work environment, thereby drastically reducing an overall index search time.

With this feature, it is possible to efficiently enhance the performance of the database system 10 by enhancing a data processing speed of the computing device and enhancing the concurrency of the work while ensuring the consistency of the index structure in the concurrent work environment.

Figure 6:
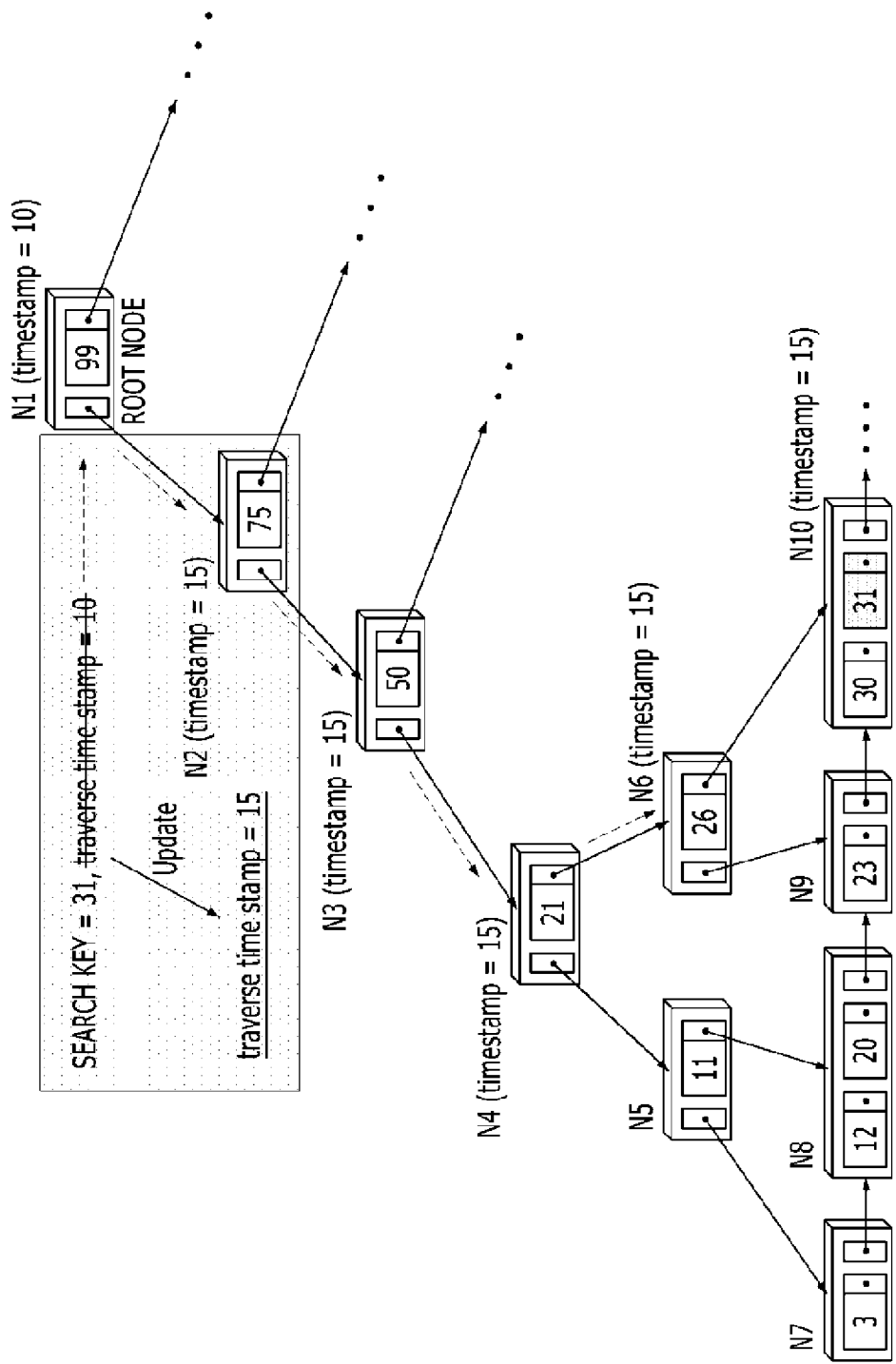
FIG. 6 is an exemplary diagram of update of a traverse time stamp according to an exemplary embodiment of the present disclosure.

FIG. 6 is an exemplary diagram of update of a traverse time stamp according to an exemplary embodiment of the present disclosure.

The processor 120 may determine whether to change the search path for the target index key based on the traverse time stamp and the index time stamp. The processor 120 may determine whether to change the search path for the target index key by comparing sizes of the traverse time stamp and the index time stamp of the search node.

More specifically, the processor 120 according to an exemplary embodiment of the present disclosure may determine to maintain the search path for the target index key when the traverse time stamp is equal to or larger than the index timestamp of the search node. Further, the processor 120 according to an exemplary embodiment of the present disclosure may determine to change the search path for the target index key when the traverse time stamp is smaller than the index time stamp of the search node.

The processor 120 according to an exemplary embodiment of the present disclosure may update the traverse time stamp when determining to change the search path for the target index key. More specifically, the processor 120 may determine to change the search path by comparing the traverse time stamp assigned to the index search thread and the index timestamp of the search node. In addition, when the processor 120 determines to change the search path, the processor 120 may assign a new traverse time stamp for searching the target index key in the changed index tree 300 to the index search thread. Here, the newly issued traverse time stamp may be assigned so as to be equal to or larger than the index time stamp of the search node which is being currently searched.

Accordingly, when the index search thread starts the re-search and reaches the search node again, the processor 120 may prevent a problem that the re-search needs to be performed again because the newly issued traverse time stamp is smaller than the current index time stamp.

More specifically, the processor 120 according to an exemplary embodiment of the present disclosure may update the traverse time stamp based on information on the time of comparing the traverse time stamp and the index time stamp of the search node. The processor 120 may determine to change the search path based on a fact that the traverse time stamp is smaller than the index time stamp of the search node. In addition, the processor 120 may reissue the traverse time stamp corresponding to the time when the index search thread determines to change the search path, i.e., the time when the index search thread stops the search for the target index key.

The processor 120 according to another exemplary embodiment of the present disclosure may update the traverse time stamp based on time information at which the index search thread initiates the read of the start node of the re-search. The processor 120 may determine a re-search start node to start the re-search based on the index timestamp of the search node and the timestamp table 400. In addition, the processor 120 may reissue the traverse time stamp corresponding to the time when the index search thread initiates the re-search, i.e., the time when the index search thread reads the start node of the re-search.

The processor 120 according to an exemplary embodiment of the present disclosure may update the traverse time stamp when determining to maintain the search path for the target index key. More specifically, the processor 120 may determine to maintain the search path based on a fact that the traverse time stamp is equal to or larger than the index time stamp of the current search node. In addition, the processor 120 may update the traverse time stamp assigned to the index search thread to correspond to the index time stamp of the current node. Accordingly, the updated traverse time stamp may be issued so as to be continuously equal to or larger than the index time stamp of the search node which is being currently searched.

The processor 120 according to another exemplary embodiment of the present disclosure may determine to change the search path based on a fact that the traverse time stamp is smaller than the index time stamp of the current search node. In addition, the processor 120 compares the bound information of the current search node and the target index key to determine to maintain the search path for the target index key when the value of the target index key is included in an interval where the upper bound key and/or lower bound key are/is formed. Further, the processor 120 may update the traverse time stamp to the index time stamp of the current search node when determining to maintain the search path for the target index key. Accordingly, the processor 120 determines a change which does not influence the search path among the structural changes for the current search node to maintain the index search through the updated traverse time stamp without starting the re-search in the previous search node.

Accordingly, the processor 120 according to an exemplary embodiment of the present disclosure may minimize an interval for returning for re-searching in the search path and reattempt the search in a nearest node even though the structure of the index tree 300 is changed by another thread based on the traverse time stamp recorded in the process in which the index search thread starts the search for the target index key value, the index time stamp obtained in the process of the index search, and a time stamp table in which the value of the index time stamp is written. In addition, in this way, it is possible to greatly reduce a search interval required for the re-search in a concurrent work environment, thereby drastically reducing an overall index search time.

With this feature, it is possible to efficiently enhance the performance of the database system 10 by enhancing a data processing speed of the computing device and enhancing the concurrency of the work while ensuring the consistency of the index structure in the concurrent work environment.

Figure 7:
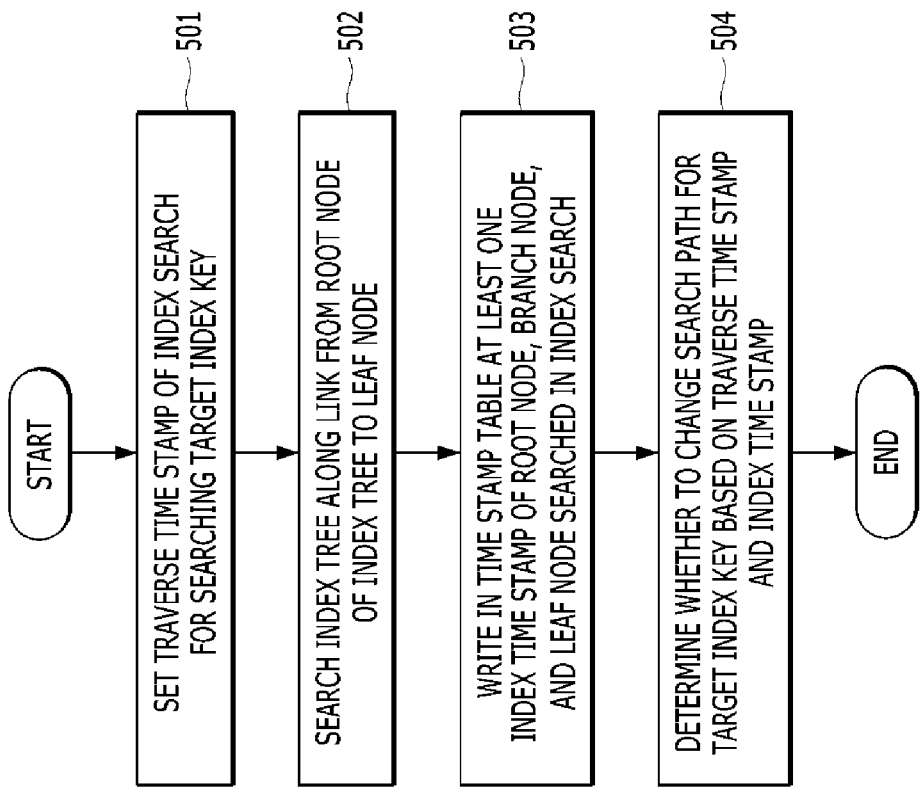
FIG. 7 is a flowchart of a method for searching an index according to an exemplary embodiment of the present disclosure.

FIG. 7 is a flowchart of a method for searching an index according to an exemplary embodiment of the present disclosure.

The index search according to an exemplary embodiment of the present disclosure may be performed by a computing device. Here, the computing device may include one or more processors 120 and a memory storing commands executable by one or more processors. Hereinafter, an order in which the computing device searches a specific index in the index tree 300 will be described in detail.

The computing device according to an exemplary embodiment of the present disclosure may set the traverse time stamp of an index search for searching the target index key (501). More specifically, when the processor 120 receives the query issued from the client 200 to retrieve the target index key value, the processor 120 may assign the target index key value to the index search thread that performs the index search. The processor 120 may then generate the traverse time stamp based on the time that the index search thread assigns the search of the target index key value. In addition, the index search thread may perform the index search for the target index key until reaching the leaf node 350 which is the bottommost level from the root node 310 which is the node at the topmost level of the index tree 300 via the branch node 330 based on the traverse time stamp.

The computing device according to an exemplary embodiment of the present disclosure may set the index time stamp based on modified time information for each node included in the index tree 300. More specifically, the computing device may modify each node included in the index tree 300. Here, the modification of the node may include modification (e.g., adding, deleting, and changing the index key value) of the index value included in the node or a structural change of the index tree 300. The structural change of the index tree 300 may include changes for indexes where a path of the index search may be changed. For example, the structural change of the index tree 300 may include at least one of deleting the node, splitting the node, and changing a node connection link. The description of the structural change of the index tree 300 is only an example, and the present disclosure is not limited thereto. The computing device may then generate the index time stamp for each node based on the time at which each node is modified. The index search thread may then perform the index search based on the traverse time stamp and the index time stamp of the search node.

According to an exemplary embodiment of the present disclosure, the processor 120 may search the index tree from the root node. The computing device may search the index tree 300 along a link from the root node 310 of the index tree 300 to the leaf node 350 (502). Here, a direction from the root node 310 to the leaf node 350 may indicate a direction from the topmost level to the bottommost level of the index tree 300. Accordingly, the index search thread may perform the index search from the root node 310 to the branch node 330 and from the branch node 330 to the leaf node 350.

The computing device may then write in the time stamp table 400 at least one index time stamp of the root node 310, the branch node 330, and the leaf node 350 read in the index search (503). More specifically, the computing device may generate a traverse time index based on the time that the target index key is assigned to the index search thread.

Further, the computing device may allow the index search thread to obtain the index time stamp of the root node 310 while reading the root node 310 in order to start the index search for the target index key. In addition, the computing device may write the obtained index time stamp of the root node 310 in the time stamp table 400. As a result, the computing device may determine a time when last modification for the root node 310 occurs.

Further, the computing device compares the index key of the root node 310 and the target index key to determine one of the child nodes connected to the root node 310 through the link as the search path. In addition, the computing device may allow the index search thread to obtain the index time stamp of the corresponding node while reading the child node (e.g., branch node 330) determined as the search path. In addition, the computing device may write the obtained index time stamp of the child node in the time stamp table 400.

As a result, the computing device may determine a time when last modification for the root node 310 and the child node (e.g., branch node 330) occurs. That is, the computing device may obtain the index time stamp of all nodes which the index search thread reads while performing the index search for the target index key, that is, the search node and write the obtained index time stamp in the time stamp table 400.

Here, the computing device may be capable of performing an operation in which the index search thread reads the search node and compares the target index key and the index key of the search node and an operation in which the index search thread reads the search node and obtains the index time stamp and writes the obtained index time stamp in the time stamp table 400 regardless of a pre/post process.

The computing device according to an exemplary embodiment of the present disclosure may match the index time stamp read in at least one of the root node 310, the branch node 330, and the leaf node 350 with each node identifier and write the corresponding index time stamp matched with each node identifier in the time stamp table 400. More specifically, all nodes included in the index tree 300 may include a node identifier capable of identifying each node. Here, the node identifier includes at least one of a name of the node, a storage location of the node, and relationship information between the nodes to allow the computing device to identify the corresponding node through the node identifier.

The computing device according to an exemplary embodiment of the present disclosure may write in the timestamp table 400 an index time stamp from a current search node to a pre-set number of previous search nodes among the search nodes read in the index search. More specifically, the computing device may set the number of nodes to be written in the time stamp table 400 in advance.

The computing device according to an exemplary embodiment of the present disclosure may delete one or more index time stamps written in the time stamp table 400 based on a predetermined criterion. More specifically, in the computing device, the index search thread may additionally obtain the index time stamp for the search node in a state where a predetermined number of index timestamps are written in the time stamp table 400. In this case, the computing device may determine to delete at least one of the index time stamps written in the time stamp table 400 based on the predetermined criterion. Here, in the predetermined criterion, the index time stamp in which the time when the index search thread obtains the index time stamp is earliest may be deleted or the index time stamp for the topmost-level node may be deleted in the structure of the index tree 300. That is, the computing device may maintain the number of index time stamps written in the time stamp table 400 at a predetermined level.

As a result, the computing device may write information required for determining the re-search start node even while maintaining a size of the time stamp table which may be indefinitely increased as the search path becomes longer at a predetermined level.

The computing device may determine whether to change the search path for the target index key based on the traverse time stamp and the index time stamp (504). More specifically, the computing device may determine to maintain the search path for the target index key when the traverse time stamp recorded in the index search thread is equal to or larger than the index timestamp of the search node. Further, the computing device may determine to change the search path for the target index key when the traverse time stamp is smaller than the index time stamp of the search node.

More specifically, the computing device according to an exemplary embodiment of the present disclosure may determine to maintain the search path for the target index key when the traverse time stamp is equal to or larger than the index timestamp of the search node.

The computing device according to an exemplary embodiment of the present disclosure may update the traverse time stamp when determining to change the search path for the target index key. More specifically, the computing device may determine to change the search path by comparing the traverse time stamp assigned to the index search thread and the index timestamp of the search node. In addition, when the computing device determines to change the search path, the computing device may issue a new traverse time stamp for searching the target index key in the changed index tree 300 to the index search thread. Here, the newly issued traverse time stamp may be issued so as to be equal to or larger than the index time stamp of the search node which is being currently searched.

Accordingly, when the index search thread starts the re-search and reaches the search node again, the computing device may prevent a problem that the re-search needs to be performed again because the newly issued traverse time stamp is smaller than the current index time stamp.

More specifically, the computing device according to an exemplary embodiment of the present disclosure may update the traverse time stamp based on information on the time of comparing the traverse time stamp and the index time stamp of the search node. The computing device may determine to change the search path based on a fact that the traverse time stamp is smaller than the index time stamp of the search node. In addition, the computing device may reissue the traverse time stamp corresponding to the time when the index search thread determines to change the search path, i.e., the time when the index search thread stops the search for the target index key.

The computing device according to another exemplary embodiment of the present disclosure may update the traverse time stamp based on time information at which the index search thread initiates the read of the start node of the re-search. The computing device may determine a re-search start node to start the re-search based on the index timestamp of the search node and the timestamp table 400. In addition, the computing device may reissue the traverse time stamp corresponding to the time when the index search thread initiates the re-search, i.e., the time when the index search thread reads the start node of the re-search.

The computing device may determine the start node of the re-search at least partially based on the time stamp table 400. More specifically, the computing device may obtain the index time stamps of the nodes which the index search thread reads to search the target index key, i.e., the search nodes. In addition, the computing device may match the identifier (e.g., a node name, a node address, etc.) of each node and the index time stamp of the corresponding node and write the matched identifier and index time stamp in the time stamp table 400. According to the exemplary embodiment, the computing device may set the number of nodes to be written in the time stamp table 400 and manage the time stamp table 400 according to the set number. Further, according to the exemplary embodiment, the computing device may delete node identifier and the index time stamp written in the time stamp table 400.

The computing device according to an exemplary embodiment of the present disclosure may determine whether each previous search node written in the time stamp table 400 is changed after the search. Here, the computing device may determine whether each of the previous search nodes is changed after the search by comparing the index time stamp of each previous search node written in the time stamp table 400 and each previous search node read at the time of the re-search with each other. In addition, the computing device may determine as the start node of the re-search one of previous search nodes which are not changed after the search among the previous search nodes.

More specifically, the computing device may match and store the node identifier and the index time stamp for the search node in the time stamp table 400. Further, the computing device may determine to change the search path for the target index key when the traverse time stamp is smaller than the index time stamp of the search node. As a result, the computing device may obtain the index time stamp again by reading each previous search node included in the search path in order to re-search the target index key.

Accordingly, the computing device may determine a previous search node which is not changed after the search among the previous search nodes of the search path for the target index key. In addition, the computing device may determine as a start node of the re-search one of previous search nodes which are not changed after the search.

The computing device according to an exemplary embodiment of the present disclosure may determine as the start node of the re-search the nearest node to the current search node among the previous search nodes which are not changed after the search. More specifically, the computing device may determine whether one or more previous search nodes written in the time stamp table 400 are changed after the search. In addition, the computing device may determine whether the previous search nodes are changed after the search by returning to a past search path, i.e., in a reverse order of the search path from the search node which is just previously searched among the previous search nodes. Then, the computing device may determine as the start node of the re-search a node closest to the current search node, i.e., an existing search node of which search is terminated among one or more search nodes which are not changed after the search time.

Here, the computing device may determine the search node as the start node of the re-search when the node which is just previously searched among the previous search nodes is not changed after the search according to the exemplary embodiment. In addition, according to another exemplary embodiment, the computing device may determine whether one or more search nodes written in the time stamp table 400 are changed after the search and then, determine the nearest node among the unchanged nodes as the start node of the re-search.

Accordingly, the computing device according to an exemplary embodiment of the present disclosure may minimize an interval for returning for re-searching in the search path and reattempt the search in a nearest node even though the structure of the index tree 300 is changed by another thread based on the traverse time stamp written in the process in which the index search thread starts the search for the target index key value and the index time stamp obtained in the process of the index search. In addition, in this way, it is possible to greatly reduce a search interval required for the re-search in a concurrent work environment, thereby drastically reducing an overall index search time.

With this feature, it is possible to efficiently enhance the performance of the database system 10 by enhancing a data processing speed of the computing device and enhancing the concurrency of the work while ensuring the consistency of the index structure in the concurrent work environment.

Figure 8:
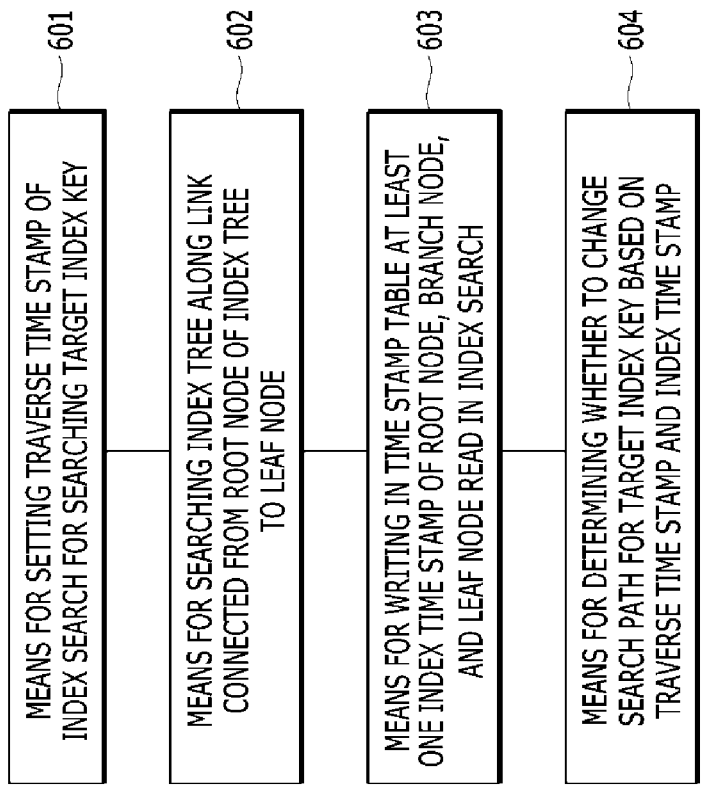
FIG. 8 is a block diagram illustrating a means for searching an index a database system according to an exemplary embodiment of the present disclosure.

FIG. 8 is a block diagram illustrating a means for searching an index a database system according to an exemplary embodiment of the present disclosure.

According to an exemplary embodiment of the present disclosure, the computing device may include: in order to enhance search performance of data, a means 601 for setting a traverse time stamp of an index search for searching a target index key; a means 602 for searching the index tree along a link connected from a root node of the index tree to a leaf node; a means 603 for writing in a time stamp table at least one index time stamp of the root node, a branch node, and the leaf node read in the index search; and a means 604 for determining whether to change a search path for the target index key based on the traverse time stamp and the index time stamp.

Alternatively, the index time stamp may be assigned for each node included in the index tree and generated based on information on a time when each node is modified.

Alternatively, the means for writing in the time stamp table at least one index time stamp of the root node, the branch node, and the leaf node read in the index search may include a means for matching the index time stamp read in at least one of the root node, the branch node, and the leaf node with each node identifier and writing the matched index time stamp and node identifier in the time stamp table.

Alternatively, the means for writing in the time stamp table at least one index time stamp of the root node, the branch node, and the leaf node read in the index search may include a means for writing in the time stamp table the index time stamp from a current search node up to a predetermined number of previous search nodes among the search nodes read in the index search.

Alternatively, the means for writing in the time stamp table at least one index time stamp of the root node, the branch node, and the leaf node read in the index search may further include a means for deleting the one or more index time stamps written in the time stamp table based on a predetermined criterion.

Alternatively, the means for determining whether to change the search path for the target index key based on the traverse time stamp and the index time stamp may include a means for determining to maintain the search path for the target index key when the traverse time stamp is equal to or larger than the index time stamp of the search node, and a means for determining to change the search path for the target index key when the traverse time stamp is smaller than the index time stamp of the search node.

Alternatively, the means for determining whether to change the search path for the target index key based on the traverse time stamp and the index time stamp may include a means for determining whether to change the search path for the target index key based on contents of the search node when the traverse time stamp is smaller than the index time stamp of the search node.

Alternatively, the means for determining whether to change the search path for the target index key based on contents of the search node when the traverse time stamp is smaller than the index time stamp of the search node may include a means for determining whether the search path for the target index key needs to be changed based on bound information including at least one information of a minimum value and a maximum value of an index key which may be included in the search node for the search node and the target index key.

Alternatively, the means for the determining whether the search path for the target index key needs to be changed based on the bound information including at least one information of the minimum value and the maximum value of the index key which may be included in the search node for the search node and the target index key may include a means for determining to maintain the search path for the target index key when a value of the target index key falls within the bound information, and a means for determining to change the search path for the target index key when the value of the target index key does not fall within the bound information.

Alternatively, the means for determining whether to change the search path for the target index key based on contents of the search node when the traverse time stamp is smaller than the index time stamp of the search node may further include a means for updating the traverse time stamp based on the index time stamp of the current search node when determining to maintain the search path for the target index key.

Alternatively, the computing device may further include a means for updating the traverse time stamp when determining to change the search path for the target index key.

Alternatively, the means for updating the traverse time stamp may include a means for updating the traverse time stamp based on a time information when comparing the traverse time stamp and the index time stamp of the search node or updating the traverse time stamp based on a time information when an index search threads starts reading of a start node of re-search.

Alternatively, the computing device may further include a means for determining the start node of the re-search at least partially based on the time stamp table.

Alternatively, the means for determining the start node of the re-search at least partially based on the time stamp table may include a means for determining whether each previous search node written in the time stamp table is changed after the search, and a means for determining as the start node of the re-search one of previous search nodes which are not changed after the search among the previous search nodes.

Alternatively, the means for determining whether each previous search node written in the time stamp table is changed after the search may include a means for determining whether the previous search node is changed after the search by comparing each index time stamp of the previous search node written in the time stamp table and the index time stamp of each previous search node read at the time of the re-search.

Alternatively, the means for determining as the start node of the re-search one of previous search nodes which are not changed after the search among the previous search nodes may include a means for determining as the start node of the re-search a nearest node of the current search node among the previous search nodes which are not changed after the search.

Figure 9:
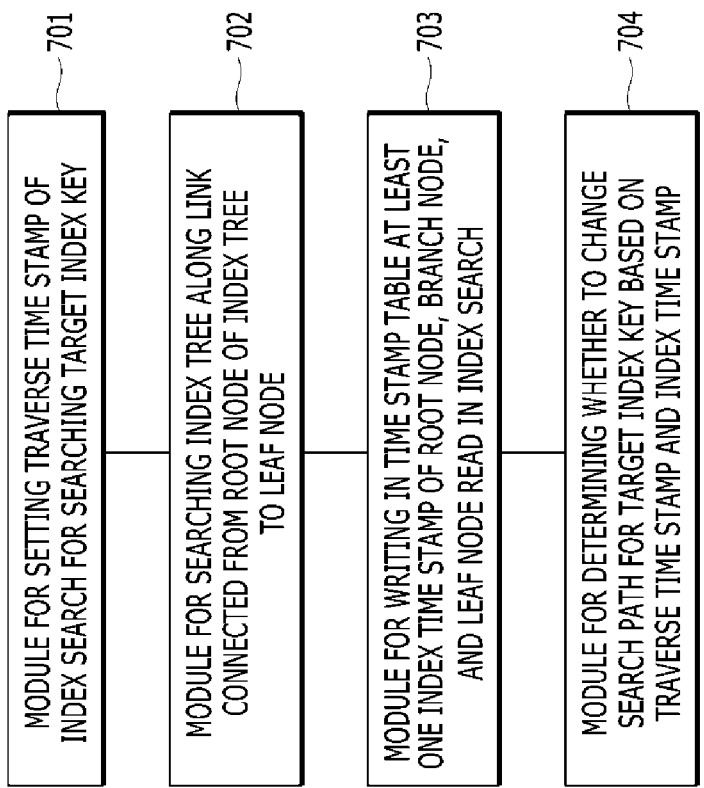
FIG. 9 is a block diagram illustrating a module for searching an index a database system according to an exemplary embodiment of the present disclosure.

FIG. 9 is a block diagram illustrating a module for searching an index a database system according to an exemplary embodiment of the present disclosure.

According to an exemplary embodiment of the present disclosure, the computing device may include: in order to enhance search performance of data, a module 701 for setting a traverse time stamp of an index search for searching a target index key; a module 702 for searching the index tree along a link connected from a root node of the index tree to a leaf node; a module 703 for writing in a time stamp table at least one index time stamp of the root node, a branch node, and the leaf node read in the index search; and a module 704 for determining whether to change a search path for the target index key based on the traverse time stamp and the index time stamp.

Figure 10:
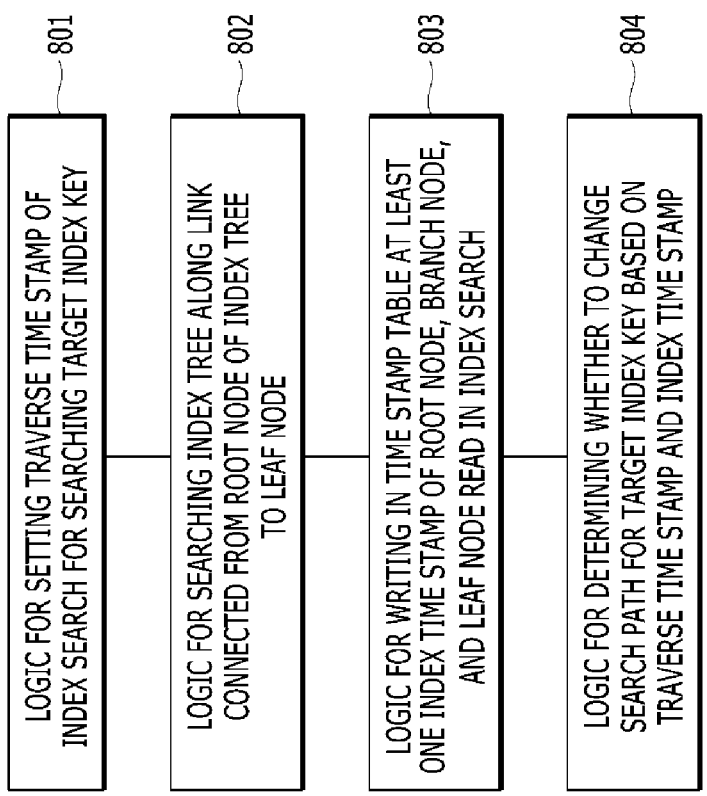
FIG. 10 is a block diagram illustrating a logic for searching an index in a database system according to an exemplary embodiment of the present disclosure.

FIG. 10 is a block diagram illustrating a logic for searching an index a database system according to an exemplary embodiment of the present disclosure.

According to an exemplary embodiment of the present disclosure, the computing device may include: in order to enhance search performance of data, a logic 801 for setting a traverse time stamp of an index search for searching a target index key; a logic 802 for searching the index tree along a link connected from a root node of the index tree to a leaf node; a logic 803 for writing in a time stamp table at least one index time stamp of the root node, a branch node, and the leaf node read in the index search; and a logic 804 for determining whether to change a search path for the target index key based on the traverse time stamp and the index time stamp.

Figure 11:
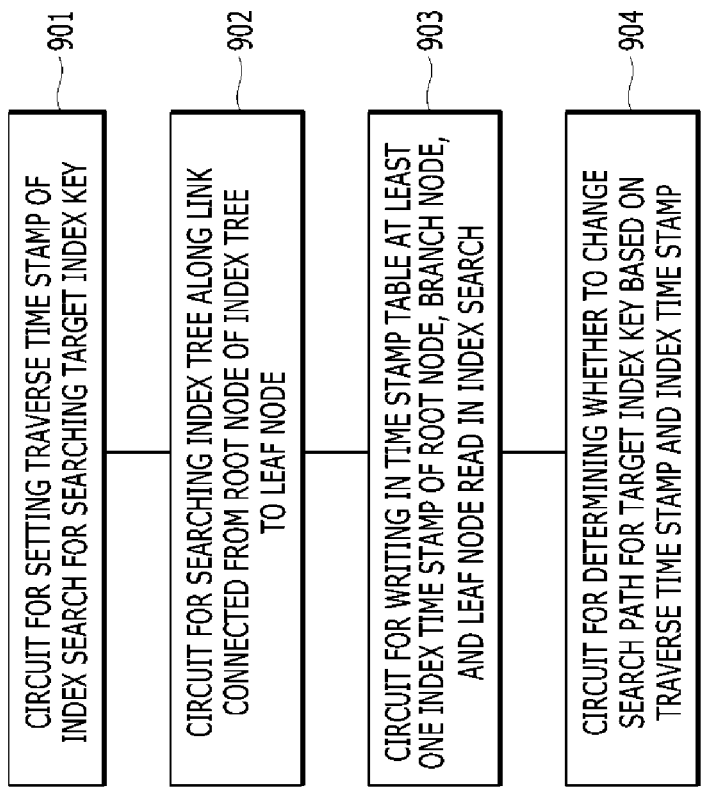
FIG. 11 is a block diagram illustrating a circuit for searching an index a database system according to an exemplary embodiment of the present disclosure.

FIG. 11 is a block diagram illustrating a circuit for searching an index in a database system according to an exemplary embodiment of the present disclosure.

According to an exemplary embodiment of the present disclosure, the computing device may include: in order to enhance search performance, a circuit 901 for setting a traverse time stamp of an index search for searching a target index key; a circuit 902 for searching the index tree along a link connected from a root node of the index tree to a leaf node; a circuit 903 for writing in a time stamp table at least one index time stamp of the root node, a branch node, and the leaf node read in the index search; and a circuit 904 for determining whether to change a search path for the target index key based on the traverse time stamp and the index time stamp.

Those skilled in the art needs to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application, but such implementation decisions should not be interpreted as causing a departure from the scope of the present disclosure.

Figure 12:
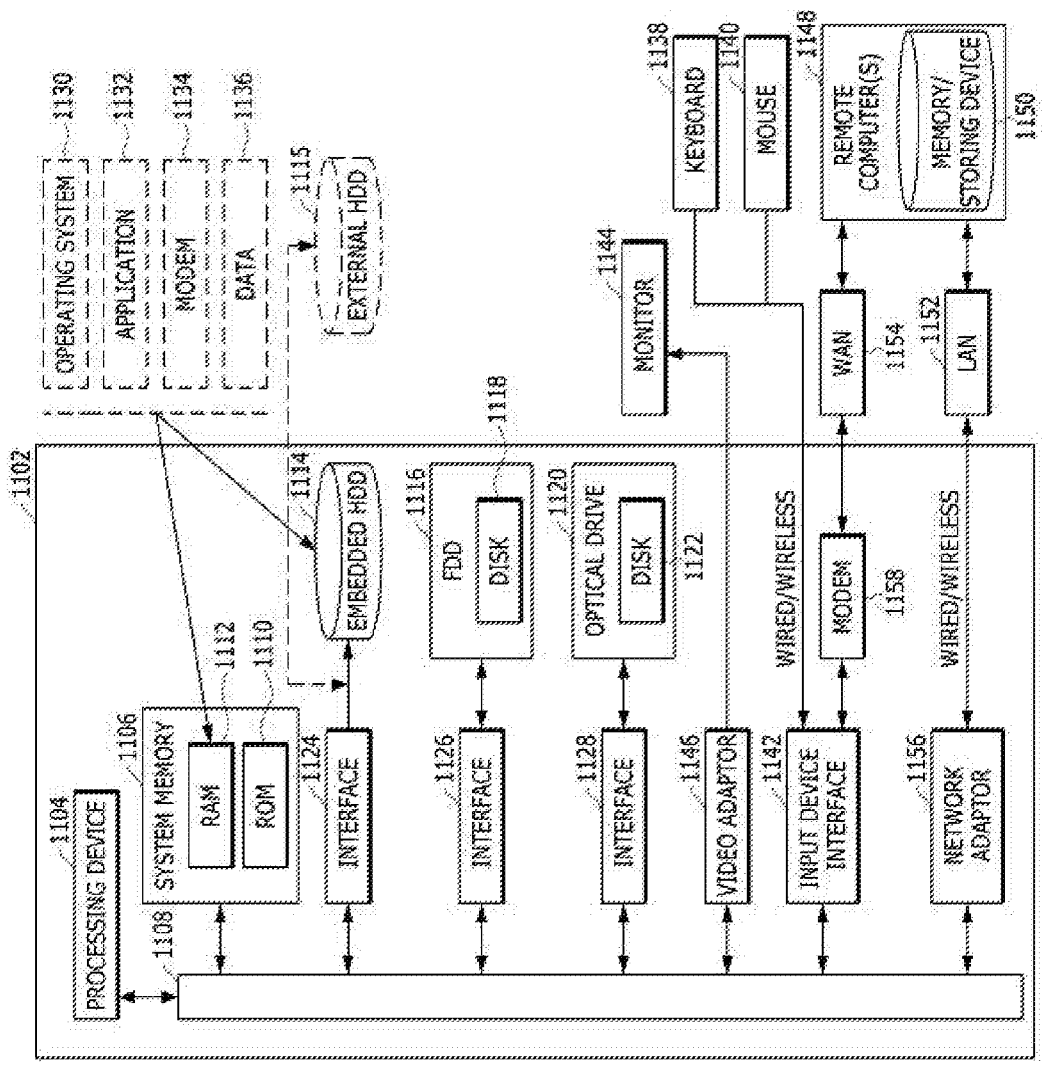
FIG. 12 is a block diagram of a computing device according to an exemplary embodiment of the present disclosure.

FIG. 12 is a block diagram of a computing device according to an exemplary embodiment of the present disclosure. FIG. 12 illustrates a simple and general schematic view of an exemplary computing environment in which the exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices) as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary and non-temporary media, and movable and non-movable media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such as a device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. Herein, the media may include storage media and transmission media. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. Further, the transmission media include a wireless channel and various other media which are capable of transferring a command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is consistent with the principles and new features presented herein.

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. Herein, the media may include storage media and transmission media. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. Further, the transmission media include a wireless channel and various other media which are capable of transferring a command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is consistent with the principles and new features presented herein.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A non-transitory computer-readable storage medium storing a computer program, wherein the computer program executes operations for enhancing search performance of data when the computer program is executed by one or more processors, the operations comprising:
    setting a traverse time stamp of an index search for searching a target index key;
    searching an index tree along a link connected from a root node of the index tree to a leaf node;
    writing in a time stamp table at least one index time stamp of the root node, a branch node, and the leaf node read in the index search; and
    determining whether to change a search path for the target index key based on the traverse time stamp and the index time stamp, wherein the determining of whether to change the search path for the target index key based on the traverse time stamp and the index time stamp includes:
    determining whether to change the search path for the target index key based on contents of a search node when the traverse time stamp is smaller than the index time stamp of the search node, and
    updating the traverse time stamp based on the index time stamp of a current search node when determining to maintain the search path for the target index key, wherein an updated traverse time stamp is issued so as to be equal to or larger than the index time stamp of the current search node.

2. The computer program of claim 1, wherein the index time stamp is assigned for each node included in the index tree and generated based on information on a time when each node is modified.

3. The computer program of claim 1, wherein the writing in the time stamp table of at least one index time stamp of the root node, the branch node, and the leaf node read in the index search, further comprises:
    matching the index time stamp read in at least one of the root node, the branch node, and the leaf node with each node identifier and writing the matched index time stamp and node identifier in the time stamp table.

4. The computer program of claim 1, wherein the writing in the time stamp table of at least one index time stamp of the root node, the branch node, and the leaf node read in the index search, further comprises:
    writing in the time stamp table the index time stamp from a current search node up to a predetermined number of previous search nodes among search nodes read in the index search.

5. The computer program of claim 4, wherein the writing in the time stamp table of at least one index time stamp of the root node, the branch node, and the leaf node read in the index search, further comprises:
    deleting the one or more index time stamps written in the time stamp table based on a predetermined criterion.

6. The computer program of claim 1, wherein the determining of whether to change the search path for the target index key based on the traverse time stamp and the index time stamp, further comprises:
    determining to maintain the search path for the target index key when the traverse time stamp is equal to or larger than the index time stamp of the search node, and
    determining to change the search path for the target index key when the traverse time stamp is smaller than the index time stamp of the search node.

7. The computer program of claim 1, wherein the determining of whether to change the search path for the target index key based on contents of the search node when the traverse time stamp is smaller than the index time stamp of the search node, further comprises:
    determining whether the search path for the target index key needs to be changed based on bound information including at least one information of a minimum value and a maximum value of an index key which may be included in the search node for the search node and the target index key.

8. The computer program of claim 7, wherein the determining of whether the search path for the target index key needs to be changed based on the bound information including at least one information of the minimum value and the maximum value of the index key which may be included in the search node for the search node and the target index key, further comprises:
    determining to maintain the search path for the target index key when a value of the target index key falls within the bound information, and
    determining to change the search path for the target index key when the value of the target index key does not fall within the bound information.

9. The computer program of claim 1, further comprising:
    updating the traverse time stamp when determining to change the search path for the target index key.

10. The computer program of claim 9, wherein the updating of the traverse time stamp, further comprises:
    updating the traverse time stamp based on a time information when comparing the traverse time stamp and the index time stamp of the search node or updating the traverse time stamp based on a time information when an index search threads starts reading of a start node of re-search.

11. The computer program of claim 1, further comprising:
   determining a start node of re-search at least partially based on the time stamp table.

12. The computer program of claim 11, wherein the determining of the start node of the re-search at least partially based on the time stamp table, further comprises:
   determining whether each previous search node written in the time stamp table is changed after the search, and
   determining as the start node of the re-search one of previous search nodes which are not changed after the search among the previous search nodes.

13. The computer program of claim 12, wherein the determining of whether each previous search node written in the time stamp table is changed after the search, further comprises:
   determining whether the previous search node is changed after the search by comparing each index time stamp of the previous search node written in the time stamp table and the index time stamp of each previous search node read at the time of the re-search.

14. The computer program of claim 12, wherein the determining as the start node of the re-search of one of previous search nodes which are not changed after the search among the previous search nodes, further comprises:
   determining as the start node of the re-search a nearest node of the current search node among the previous search nodes which are not changed after the search.

15. A method for enhancing search performance of data, the method comprising:
   setting a traverse time stamp of an index search for searching a target index key;
   searching an index tree along a link connected from a root node of the index tree to a leaf node;
   writing in a time stamp table at least one index time stamp of the root node, a branch node, and the leaf node read in the index search; and
   determining whether to change a search path for the target index key based on the traverse time stamp and the index time stamp, wherein the determining of whether to change the search path for the target index key based on the traverse time stamp and the index time stamp includes:
      determining whether to change the search path for the target index key based on contents of a search node when the traverse time stamp is smaller than the index time stamp of the search node, and
      updating the traverse time stamp based on the index time stamp of a current search node when determining to maintain the search path for the target index key, wherein an updated traverse time stamp is issued so as to be equal to or larger than the index time stamp of the current search node.

16. A computing device for enhancing search performance of data, the computing device comprising:
   a processor including one or more cores; and
   a memory, wherein the processor
   sets a traverse time stamp of an index search for searching a target index key,
   searches an index tree along a link connected from a root node of the index tree to a leaf node,
   writes in a time stamp table at least one index time stamp of the root node, a branch node, and the leaf node read in the index search, and
   determines whether to change a search path for the target index key based on the traverse time stamp and the index time stamp, wherein the determining of whether to change the search path for the target index key based on the traverse time stamp and the index time stamp includes:
      determining whether to change the search path for the target index key based on contents of a search node when the traverse time stamp is smaller than the index time stamp of the search node, and
      updating the traverse time stamp based on the index time stamp of a current search node when determining to maintain the search path for the target index key, wherein an updated traverse time stamp is issued so as to be equal to or larger than the index time stamp of the current search node.

* * * * *